(12) United States Patent
Stamatoyannopoulos et al.

(10) Patent No.: US 12,467,077 B2
(45) Date of Patent: Nov. 11, 2025

(54) COMPOSITIONS AND METHODS FOR DNA MODIFICATION DETECTION

(71) Applicant: Altius Institute for Biomedical Sciences, Seattle, WA (US)

(72) Inventors: John Stamatoyannopoulos, Seattle, WA (US); Pavel Zrazhevskiy, Seattle, WA (US)

(73) Assignee: Altius Institute for Biomedical Sciences, Seattle, WA (US)

( * ) Notice: Subject to any disclaimer, the term of this patent is extended or adjusted under 35 U.S.C. 154(b) by 1064 days.

(21) Appl. No.: 17/293,869

(22) PCT Filed: Nov. 18, 2019

(86) PCT No.: PCT/US2019/062040
§ 371 (c)(1),
(2) Date: May 13, 2021

(87) PCT Pub. No.: WO2020/106633
PCT Pub. Date: May 28, 2020

(65) Prior Publication Data
US 2022/0010366 A1    Jan. 13, 2022

Related U.S. Application Data

(60) Provisional application No. 62/806,539, filed on Feb. 15, 2019, provisional application No. 62/768,991, filed on Nov. 19, 2018.

(51) Int. Cl.
*C12Q 1/6816* (2018.01)
(52) U.S. Cl.
CPC .................. *C12Q 1/6816* (2013.01)
(58) Field of Classification Search
None
See application file for complete search history.

(56) References Cited

U.S. PATENT DOCUMENTS

| | | | |
|---|---|---|---|
| 2003/0064395 A1 | 4/2003 | Chung | |
| 2003/0082576 A1* | 5/2003 | Jones | C12Q 1/6827 435/91.2 |
| 2009/0111119 A1 | 4/2009 | Doyon et al. | |
| 2014/0364333 A1 | 12/2014 | Wu et al. | |
| 2017/0106055 A1* | 4/2017 | Jantz | A61K 38/54 |
| 2018/0289741 A1* | 10/2018 | Nicholson | A61K 39/464412 |
| 2019/0234881 A1* | 8/2019 | Stamatoyannopoulos | C12Q 1/6841 |

FOREIGN PATENT DOCUMENTS

| | | | |
|---|---|---|---|
| WO | WO 2013/066438 | * | 5/2013 |
| WO | 2018017774 | | 1/2018 |
| WO | 2019204661 | | 10/2019 |

OTHER PUBLICATIONS

Hegedus et al., (2018) "Endogenous single-strand DNA breaks at RNA polymerase II promoters in *Saccharomyces cerevisiae*", Nucleic Acid Research, 46(20):10649-10668.
Jin et al., (2015) "Genome-wide Detection of DNase I Hypersensitive Sites in Single Cells and FFPE Samples", Nature, 528(7580):142-146.
Wang et al., (2018) "Meganuclease targeting of PCSK9 in macaque liver leads to stable reduction in serum cholesterol", Nature Biotechnology, 36(8):717-725.
Watanabe et al., (2010) "Knockout of exogenous EGFP gene in porcine somatic cells using zinc-finger hucleases", Biochemical and Biophysical Research Communications, 402:14-18.

* cited by examiner

*Primary Examiner* — Amanda Haney
(74) *Attorney, Agent, or Firm* — Bozicevic, Field & Francis LLP; Shweta Chandra

(57) ABSTRACT

Provided herein are methods and compositions for use in detecting on-target and/or off-target cleavage of genomic DNA in a cell by a nuclease. The on-target and off-target cleavage is detected by using oligonucleotides that bind to the single-stranded 3'-overhang created at the cleavage site. The nuclease may be an engineered nuclease comprising a nucleic acid binding domain that binds to a target nucleic acid of interest.

23 Claims, 19 Drawing Sheets

Spots per cell= 0, 1, 2, 3, 4

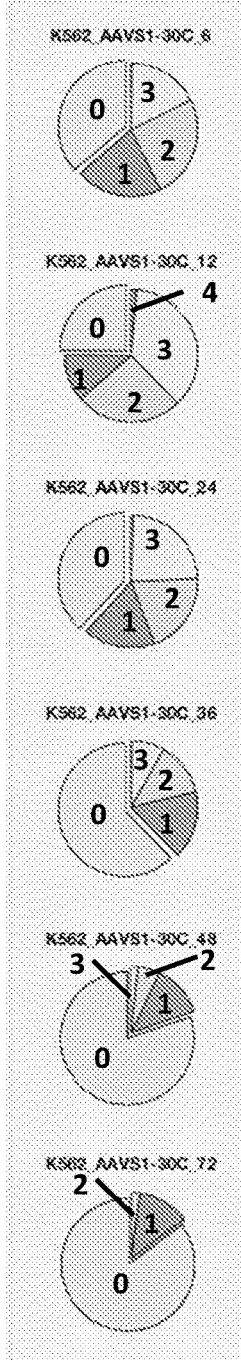
Spots per cell= 0, 1, 2, 3, 4
FIG. 9A
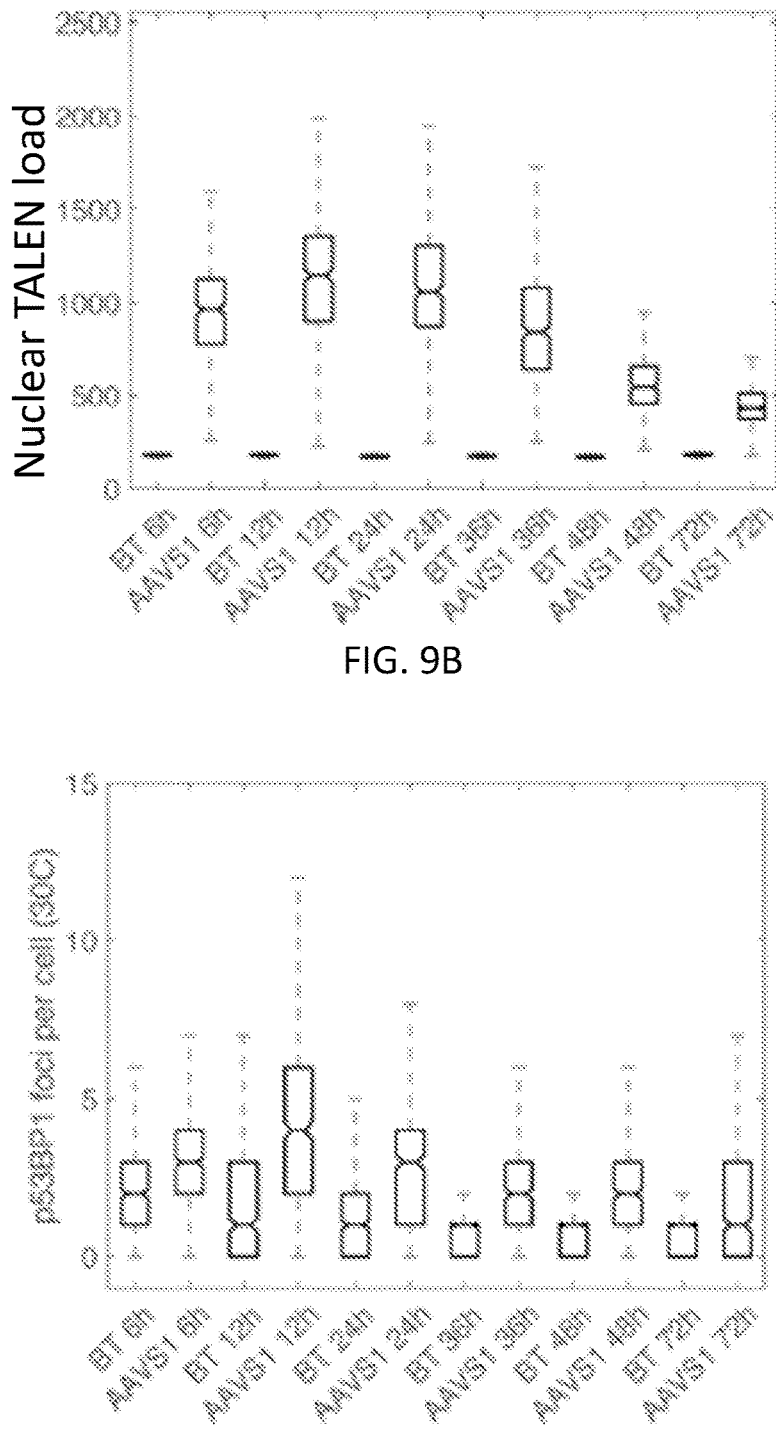
FIG. 9B
FIG. 9C

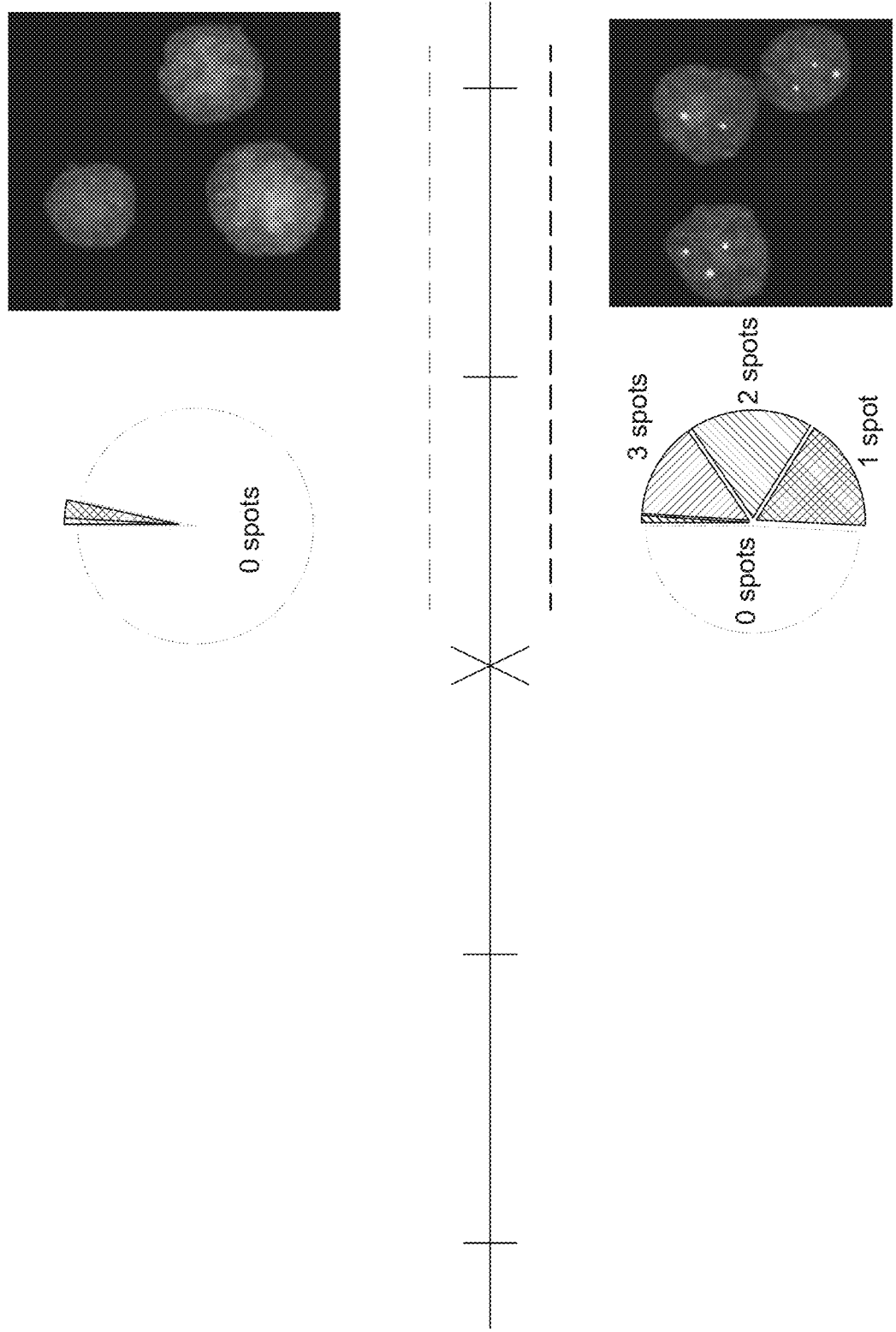

COMPOSITIONS AND METHODS FOR DNA MODIFICATION DETECTION

CROSS REFERENCE TO RELATED APPLICATION

Pursuant to 35 U.S.C. § 119(e), this application claims priority to the filing dates of U.S. provisional application Ser. No. 62/768,991, filed Nov. 19, 2018, and U.S. provisional application Ser. No. 62/806,539, filed Feb. 15, 2019 the disclosures of which is herein incorporated by reference.

INTRODUCTION

Genome editing techniques include the use of nucleases, such as, engineered nucleases conjugated to nucleic acid binding domains that bind to a target nucleic acid, to cleave a nucleic acid. Engineered nucleases programmed to target specific genomic DNA sequences are revolutionizing biology. The frequency and precision with which targeted nucleases functionally engage with individual chromatin templates within cell nuclei determines the potential for successful genome editing outcomes. Thus, there is a need for methods and reagents that allow detection of nuclease induced DNA cleavage in cells.

SUMMARY

Provided herein are methods and compositions for detecting induction of cleavage in genomic DNA in a cell. These method and compositions can be used for determining whether the cleavage was an on-target cleavage or an off-target cleavage.

BRIEF DESCRIPTION OF THE DRAWINGS

FIG. 4A. Schematic and representative images (individual cell nuclei with cutFISH spots at the same intensity scale. FIGS. 4B-4D. Spot intensity distributions for detection with 15-115 probes.

FIG. 9A shows that the number of spots per cell which indicate with the number of cleavages, peak at 12-24 hrs after introduction of TALEN-encoding mRNA correlates with the level of the TALEN expression. FIG. 9B shows that the time period of increased spot number reflecting the number of cleavages at the probed site, after introduction of TALEN-encoding mRNA correlates with the level of the TALEN expression. FIG. 9C shows that the time period of increased spot number reflecting the number of cleavages at the probed site, after introduction of TALEN-encoding mRNA correlates with the number of p53BP1 (DNA repair) foci per cell. The cells were cultured at 30° C. for 72 hrs after transfection of TALEN-encoding mRNA. Aliquots of cells were removed at the indicated time points, fixed onto slides and hybridized to oligonucleotides at 37° C.

FIG. 12 shows strand-dependency of the labeled oligonucleotide probes. Probes complementary to bottom strand region downstream of the cleavage site provide a signal while probes complementary to top strand region downstream of the cleavage site do not.

FIG. 14A shows that variability in spot number (1 or 2 spots per cell) detected for different TALENs across the CD4 promoter (bottom panel) reflects the variability in final editing efficiency as measured by % alleles with insertions/deletions (% indels, top panel) in CD4+ T-cells. FIG. 14B shows correlation between the rank-ordered nuclease activity measured by the number of spots (detected by imaging 24 hrs after transfection of TALEN mRNA) and rank-ordered final editing efficiency measured by amplicon sequencing (at 72 hrs after transfection of TALEN mRNA) in CD4+ and CD8+ T-cells.

DETAILED DESCRIPTION

Figure 1:
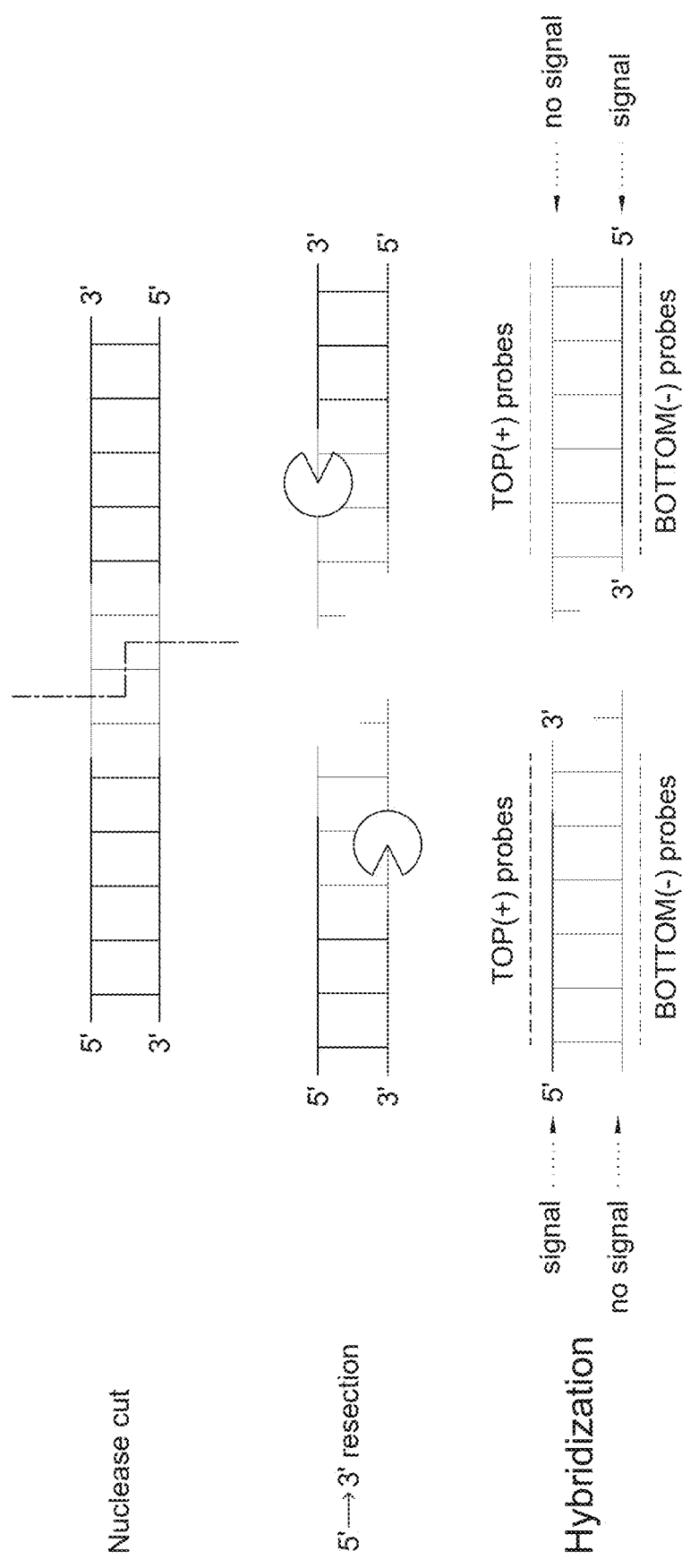
FIG. 1 is a schematic illustrating nuclease induced cleavage at a cleavage site; 5' to 3' resection at the cleavage site, creating single stranded (ss) 3'-overhang(s) in the top strand and/or the bottom strand; and detection of the ss 3'-overhang(s) by hybridization of probes that are complementary to the ss 3'-overhang(s) and lack of hybridization by probes that are complementary to the region in the top strand downstream from the nuclease cleavage site or to the region in the bottom strand upstream of the cleavage site, which regions are removed by the 5' to 3' resection at the cleavage site. While the schematic depicts a continuous single stranded region adjacent the cut introduced by the nuclease, the single stranded region may be discontinuous and may include double-stranded regions where the 5' to 3' re-sectioning has not removed the complementary sequence in the other strand. For example, the 5' to 3' re-sectioning may start at a position adjacent the site of cleavage.

Provided herein are methods and compositions for detecting induction of cleavage in genomic DNA in a cell. These method and compositions can be used for determining whether the cleavage was an on-target cleavage or an off-target cleavage.

Before exemplary embodiments of the present invention are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "a membrane anchored polynucleotide" includes a plurality of such membrane-anchored polynucleotides and reference to "the polynucleotide" includes reference to one or more polynucleotides, and so forth.

It is further noted that the claims may be drafted to exclude any element which may be optional. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. To the extent such publications may set out definitions of a term that conflicts with the explicit or implicit definition of the present disclosure, the definition of the present disclosure controls.

The section headings used herein are for organizational purposes only and are not to be construed as limiting the subject matter described in any way. While the present teachings are described in conjunction with various embodiments, it is not intended that the present teachings be limited to such embodiments. On the contrary, the present teachings encompass various alternatives, modifications, and equivalents, as will be appreciated by those of skill in the art.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

DEFINITIONS

The terms "polypeptide," "peptide," and "protein", used interchangeably herein, refer to a polymeric form of amino acids of any length, which can include genetically coded and non-genetically coded amino acids, chemically or biochemically modified or derivatized amino acids, and polypeptides having modified polypeptide backbones. The terms include fusion proteins, including, but not limited to, fusion proteins with a heterologous amino acid sequence, fusion proteins with heterologous and homologous leader sequences, with or without N-terminus methionine residues; immunologically tagged proteins; and the like. In specific embodiments, the terms refer to a polymeric form of amino acids of any length which include genetically coded amino acids. In particular embodiments, the terms refer to a polymeric form of amino acids of any length which include genetically coded amino acids fused to a heterologous amino acid sequence.

The term "heterologous" refers to two components that are defined by structures derived from different sources. For example, in the context of a polypeptide, a "heterologous" polypeptide may include operably linked amino acid sequences that are derived from different polypeptides (e.g., a DNA binding domain and a cleavage domain derived from different sources). Similarly, in the context of a polynucleotide encoding a chimeric polypeptide, a "heterologous" polynucleotide may include operably linked nucleic acid sequences that can be derived from different genes. Other exemplary "heterologous" nucleic acids include expression constructs in which a nucleic acid comprising a coding sequence is operably linked to a regulatory element (e.g., a promoter) that is from a genetic origin different from that of the coding sequence (e.g., to provide for expression in a host cell of interest, which may be of different genetic origin than the promoter, the coding sequence or both). In the context of recombinant cells, "heterologous" can refer to the presence of a nucleic acid (or gene product, such as a polypeptide) that is of a different genetic origin than the host cell in which it is present.

The term "operably linked" refers to linkage between molecules to provide a desired function. For example, "operably linked" in the context of nucleic acids refers to a functional linkage between nucleic acid sequences. By way of example, a nucleic acid expression control sequence (such as a promoter, signal sequence, or array of transcription factor binding sites) may be operably linked to a second polynucleotide, wherein the expression control sequence affects transcription and/or translation of the second polynucleotide. In the context of a polypeptide, "operably linked" refers to a functional linkage between amino acid sequences (e.g., different domains) to provide for a described activity of the polypeptide.

As used herein, the term "cleavage" refers to the breakage of the covalent backbone of a nucleic acid, e.g., a DNA molecule. Cleavage can be initiated by a variety of methods including, but not limited to, enzymatic or chemical hydrolysis of a phosphodiester bond. Both single-stranded cleavage and double-stranded cleavage are possible, and double-stranded cleavage can occur as a result of two distinct single-stranded cleavage events. DNA cleavage can result in the production of either blunt ends or staggered ends. In certain embodiments, the nucleases provided herein are used for targeted double-stranded DNA cleavage. A targeted double-stranded DNA cleavage is also referred to herein as an on-target or an off-target double strand break (DSB).

A "cleavage half-domain" is a polypeptide sequence which, in conjunction with a second polypeptide (e.g., another cleavage half-domain, either identical or different) forms a complex having cleavage activity (e.g., double-strand cleavage activity).

A "target nucleic acid," "target sequence," or "target site," used herein interchangeably with the term "nuclease target site," refer to a sequence within a nucleic acid molecule that is bound and cleaved by a nuclease. For example, this term refers to a nucleic acid sequence that defines a portion of a nucleic acid to which a binding molecule, such as, the DNA binding domain (DBD) of a nuclease disclosed herein will specifically bind. The target nucleic acid may be present in an isolated form or inside a cell. A target nucleic acid may be present in a region of interest. A "region of interest" may be any region of cellular chromatin, such as, for example, a gene or a non-coding sequence within or adjacent to a gene, in which it is desirable to introduce a cleavage, for example, for targeted recombination. A region of interest can be present in a chromosome, an episome, an organellar genome (e.g., mitochondrial, chloroplast), or an infecting viral genome, for example. A region of interest can be within the coding region of a gene, within transcribed non-coding regions such as, for example, promoter sequences, leader sequences, trailer sequences or introns, or within non-transcribed regions, either upstream or downstream of the coding region. In the context of nucleases that dimerize, for example, nucleases comprising a FokI DNA cleavage domain, target sites typically includes a left-half site (bound by one monomer of the nuclease), a right-half site (bound by the second monomer of the nuclease), and a spacer sequence between the half sites in which the cut is made.

An "exogenous" molecule is a molecule that is not normally present in a cell but can be introduced into a cell by one or more genetic, biochemical or other methods. An exogenous molecule can comprise, for example, a nuclease or a functioning version of a malfunctioning endogenous molecule, e.g. a gene or a gene segment lacking a mutation present in the endogenous gene. An exogenous nucleic acid can be present in an infecting viral genome, a plasmid or episome introduced into a cell. Methods for the introduction of exogenous molecules into cells are known to those of skill in the art and include, but are not limited to, lipid-mediated transfer (i.e., liposomes, including neutral and cationic lipids), electroporation, direct injection, cell fusion, particle bombardment, calcium phosphate co-precipitation, DEAE-dextran-mediated transfer and viral vector-mediated transfer.

By contrast, an "endogenous" molecule is one that is normally present in a particular cell at a particular developmental stage under particular environmental conditions. For example, an endogenous nucleic acid can comprise a chromosome, the genome of a mitochondrion, chloroplast or other organelle, or a naturally-occurring episomal nucleic acid. Additional endogenous molecules can include proteins, for example, transcription factors and enzymes.

By "genomic DNA" is meant DNA present in the nucleus of a cell. The genomic DNA may include stably integrated exogenous nucleic acid and may be inherited by progeny of the cell.

A "gene," for the purposes of the present disclosure, includes a DNA region encoding a gene product, as well as all DNA regions which regulate the production of the gene product, whether or not such regulatory sequences are adjacent to coding and/or transcribed sequences. Accordingly, a gene includes, but is not necessarily limited to, promoter sequences, terminators, translational regulatory sequences such as ribosome binding sites and internal ribosome entry sites, enhancers, silencers, insulators, boundary elements, replication origins, matrix attachment sites and locus control region.

"Gene expression" refers to the conversion of the information, contained in a gene, into a gene product. A gene product can be the direct transcriptional product of a gene (e.g., mRNA, tRNA, rRNA, antisense RNA, ribozyme, structural RNA, shRNA, RNAi, miRNA or any other type of RNA) or a protein produced by translation of a mRNA. Gene products also include RNAs which are modified, by processes such as capping, polyadenylation, methylation, and editing, and proteins modified by, for example, methylation, acetylation, phosphorylation, ubiquitination, ADP-ribosylation, myristylation, and glycosylation.

The term "oligonucleotide" as used herein denotes a multimer of nucleotides of about 5 to 200 nucleotides, up to 500 nucleotides in length. Oligonucleotides may be synthetic or may be made enzymatically, and, in some embodiments, are 30 to 150 nucleotides in length. Oligonucleotides may contain ribonucleotide monomers (i.e., may be oligoribonucleotides) or deoxyribonucleotide monomers, or both ribonucleotide monomers and deoxyribonucleotide monomers. An oligonucleotide may be 10 to 20, 21 to 30, 31 to 40, 41 to 50, 51 to 60, 61 to 70, 71 to 80, 80 to 100, 100 to 150 or 150 to 200 nucleotides in length, for example. An oligonucleotide may be 20-60, e.g., 30-50 or 35-45 nucleotides in length.

The term "hybridization" or "hybridizes" refers to a process in which a region of nucleic acid strand anneals to and forms a stable duplex, either a homoduplex or a heteroduplex, under normal hybridization conditions with a complementary nucleic acid strand and does not form a stable duplex with unrelated (non-complementary) nucleic acid molecules under the same normal hybridization conditions. The formation of a duplex is accomplished by annealing two complementary nucleic acids under hybridization conditions. The hybridization condition can be made to be highly specific by adjustment of the conditions under which the hybridization reaction takes place, such that two nucleic acid strands will not form a stable duplex, e.g., a duplex that retains a region of double-strandedness under normal stringency conditions, unless the two nucleic acid strands contain a certain number of nucleotides in specific sequences which are substantially or completely complementary. "Normal hybridization or normal stringency conditions" are readily determined for any given hybridization reaction. See, for example, Ausubel et al., Current Protocols in Molecular Biology, John Wiley & Sons, Inc., New York, or Sambrook et al., Molecular Cloning: A Laboratory Manual, Cold Spring Harbor Laboratory Press. As used herein, the term "hybridizing" or "hybridization" refers to any process by which a strand of nucleic acid binds with a complementary strand through base pairing.

A "label" is a moiety that facilitates detection of a molecule. Common labels in the context of the detection within a cell include fluorescent, luminescent, light-scattering, and/or colorimetric labels. Suitable labels include enzymes and fluorescent moieties, as well as quantum dots, radionuclides, substrates, cofactors, inhibitors, chemiluminescent moieties, magnetic particles, and the like. Many labels are commercially available and can be used in the present methods and compositions.

The phrase "labeled oligonucleotide" refers to an oligonucleotide that contains a detectable moiety. The detectable moiety may produce a signal directly or indirectly. Examples of detectable moiety that produce a signal directly include labels, such as, a fluorescent molecule, luminescent molecule, light-scattering molecule, quantum dots, etc. Detectable moieties that produce a signal indirectly include moieties that produce a signal upon exposure to detection reagents such as substrates or antibodies, etc. A detectable moiety that produces a signal directly can optionally be detected by indirect means such as by using a labeled antibody that binds to the moiety. In certain cases, a signal may be of a particular wavelength which is detectable by a photodetector, e.g., a light microscope, a spectrophotometer, a fluorescent microscope, a fluorescent sample reader, or a florescence activated cell sorter, etc. In certain aspects, an oligonucleotide may be labeled after hybridization to genomic DNA, for example, by forming a triplex after hybridization with another oligonucleotide that contains a label. In certain aspects, an oligonucleotide may be labeled before or after hybridization to genomic DNA, via binding to another oligonucleotide that contains a label (a reporter oligonucleotide), where the oligonucleotide includes a region that does not hybridize to the genomic DNA and is complementary to the reporter oligonucleotide.

The phrase "plurality of sets of labeled oligonucleotides" or "plurality of populations of labeled oligonucleotides" means two or more sets/populations of oligonucleotides where each set comprises at least two detectable oligonucleotides. In certain aspects, the oligonucleotides in the different sets may differ in sequence, label, or both.

The phrase "distinguishable labels," "differentially labeled," or any grammatical equivalent thereof refers to labels that can be independently detected and measured, even when the labels are mixed. In certain aspects, the amounts of label present (e.g., the amount of fluorescence) for each of the labels are separately determinable, even when the labels are co-located (e.g., in the same duplex molecule and/or in the same cell). Suitable distinguishable fluorescent label pairs include Cy-3 and Cy-5 (Amersham Inc., Piscataway, N.J.), Quasar 570 and Quasar 670 (Biosearch Technology, Novato CA), Alexafluor555 and Alexafluor647 (Molecular Probes, Eugene, OR), BODIPY V-1002 and BODIPY V1005 (Molecular Probes, Eugene, OR), POPO-3 and TOTO-3 (Molecular Probes, Eugene, OR), and POPRO3 and TOPRO3 (Molecular Probes, Eugene, OR).

The term "probes" as used herein refers to labeled oligonucleotides that hybridize to complementary nucleic acid sequences under in situ hybridization conditions. Thus, FISH probes refer to fluorescently labeled oligonucleotides that hybridize to complementary nucleic acid sequences. CUT-FISH probes refer to fluorescently labeled oligonucleotides that hybridize to ss 3'overhang created at a cleavage/cut site of a nuclease.

The terms "tiled" and "tile across" in the context of oligonucleotides refer to a set of oligonucleotides bound to complementary sites that are distributed across a region, e.g., across a region of the target DNA. Intervals or gaps may be present between complementary sites for a set of oligonucleotides that are tiled across a region. Such intervals may range from 20 to 500 nucleotides.

The term "duplex," or "duplexed," as used herein, describes two complementary polynucleotide regions that are base-paired, i.e., hybridized together.

If two nucleic acids are "complementary," they hybridize with one another under high stringency conditions. The term "perfectly complementary" is used to describe a duplex in which each base of one of the nucleic acids base pairs with a complementary nucleotide in the other nucleic acid. In many cases, two sequences that are complementary have at least 10, e.g., at least 12 or 15 complementarity nucleotides.

The term "strand" as used herein refers to a nucleic acid made up of nucleotides covalently linked together by covalent bonds, e.g., phosphodiester bonds. In a cell, DNA usually exists in a double-stranded form, and as such, has two complementary strands of nucleic acid referred to herein as the "top" and "bottom" strands or the "Watson" and "Crick" strands. Watson strand refers to 5' to 3' top strand (5' 3'), whereas Crick strand refers to 3' to 5' bottom strand (3' 5'). The assignment of a strand as being a top or bottom strand is arbitrary and does not imply any particular orientation, function or structure. In certain cases, complementary strands of a chromosomal DNA may be interchangeably referred to as "top" and "bottom" strands, "plus" and "minus" strands, the "first" and "second" strands, the "coding" and "noncoding" strands, the "Watson" and "Crick" strands, or the "sense" and "antisense" strands. The nucleotide sequences of the first strand of several mammalian chromosomal regions (e.g., BACs, assemblies, chromosomes, etc.) are known, and may be found in NCBI's Genbank database, for example.

The terms "conjugating," "conjugated," and "conjugation" refer to an association of two entities, for example, of two molecules such as two proteins, two domains (e.g., a binding domain and a cleavage domain), or a protein and an agent, e.g., a protein binding domain and a small molecule. The association can be, for example, via a direct or indirect (e.g., via a linker) covalent linkage or via non-covalent interactions. In some embodiments, the association is covalent. In some embodiments, two molecules are conjugated via a linker connecting both molecules. For example, in some embodiments where two proteins are conjugated to each other, e.g., a binding domain and a cleavage domain of an engineered nuclease, to form a protein fusion, the two proteins may be conjugated via a polypeptide linker, e.g., an amino acid sequence connecting the C-terminus of one protein to the N-terminus of the other protein. Such conjugated proteins may be expressed as a fusion protein.

The term "consensus sequence," as used herein in the context of nucleic acid sequences, refers to a sequence representing the most frequent nucleotide residues found at each position in a plurality of similar sequences. Typically, a consensus sequence is determined by sequence alignment in which similar sequences are compared to each other. In the context of nuclease target site sequences, a consensus sequence of a nuclease target site may, in some embodiments, be the sequence most frequently bound, or bound with the highest affinity, by a given nuclease.

The term "in situ" refers to "inside a cell". For example, a region of DNA being detected by in situ hybridization is present inside a cell. The cell may be permeabilized or fixed, for example. The term "hybridization" refers to the specific binding of a nucleic acid to a complementary nucleic acid via Watson-Crick base pairing. Accordingly, the term "in situ hybridization" refers to specific binding of a nucleic acid to a complementary nucleic acid inside a cell.

The term "in situ hybridization conditions" as used herein refers to conditions that allow hybridization of a nucleic acid to a complementary nucleic acid, e.g., a sequence of nucleotides in a DNA molecule and a complementary oligonucleotide, in a cell. Suitable in situ hybridization conditions may include both hybridization conditions and optional wash conditions, which conditions include temperature, concentration of denaturing reagents, salts, incubation time, etc. Such conditions are known in the art. In certain aspects, the methods of the present disclosure do not involve use of denaturation conditions that would result in separation of the strands of the genomic DNA to a significant extent (e.g., melting of the duplex to form single stranded regions more than 20 nucleotides long or denaturation leading to separation of more than 100 nucleotide long region in genomic DNA). In certain aspects, the temperature and/or concentration of denaturing reagents is sufficiently low to avoid significant denaturation of genomic DNA while allowing for specific hybridization and removal of any non-specifically hybridized oligonucleotides. In certain aspects, the hybridization may be performed at a temperature of 18° C.-50° C. In certain aspects, the hybridization may be performed at a temperature of about 37° C. In certain aspects, the hybridization may be performed under conditions where a substantial amount of a denaturing agent is not included. For example, the hybridization condition includes less than 55%, less than 50%, less than 20%, less than 10%, or less than 5% denaturing agent, such as, formamide. In certain aspects, the hybridization may be performed at a temperature of about 37° C. and in hybridization buffer including 50% formamide, which does not cause detectable denaturation of genomic DNA.

As used herein, the term "derived" in the context of a polypeptide refers to a polypeptide that has a sequence that is based on that of a protein from a particular source. A polypeptide derived from a protein from a particular source may be a variant of the protein from the particular source. For example, a polypeptide derived from a protein from a particular source may have a sequence that is modified with respect to the protein's sequence from which it is derived. A polypeptide derived from a protein from a particular source shares at least 50% sequence identity with, at least 60% sequence identity with, at least 70% sequence identity with, at least 80% sequence identity with, or at least 90% sequence identity with the protein from which it is derived.

The term "modular" as used herein in the context of a nucleic acid binding domain, e.g., a DBD indicates that the plurality of repeat units present in the DBD can be rearranged and/or replaced with other repeat units and can be arranged in an order such that the DBD binds to the target nucleic acid. For example, any repeat unit in a modular DBD can be switched with a different repeat unit. In some embodiments, modularity of DBDs described herein allows for swapping out a particular repeat unit for another repeat unit to increase the affinity of the repeat unit for a particular target nucleic acid. Overall, the modular nature of the DBDs disclosed herein enables the development of nucleases that can precisely target any nucleic acid sequence of interest.

The term "effective amount," as used herein, refers to an amount of a biologically active agent that is sufficient to elicit a desired biological response. For example, in some embodiments, an effective amount of a nuclease may refer to the amount of the nuclease that is sufficient to induce cleavage of a target site specifically bound and cleaved by the nuclease. As will be appreciated by the skilled artisan, the effective amount of an agent, e.g., a nuclease, a hybrid protein, or a polynucleotide, may vary depending on various factors as, for example, on the desired biological response, the specific allele, genome, target site, cell, or tissue being targeted, and the agent being used.

The term "nuclease," as used herein, refers to an agent capable of cleaving a phosphodiester bond connecting nucleotide residues in a nucleic acid molecule. In some embodiments, a nuclease is a protein, e.g., an enzyme that can bind a nucleic acid molecule and cleave a phosphodiester bond connecting nucleotide residues within the nucleic acid molecule. A nuclease may be an endonuclease, cleaving a phosphodiester bonds within a polynucleotide chain, or an exonuclease, cleaving a phosphodiester bond at the end of the polynucleotide chain. In some embodiments, a nuclease is a site-specific nuclease that binds to a specific nucleotide sequence and cleaves a specific phosphodiester bond within the specific nucleotide sequence. The specific nucleotide sequence is also referred to herein as the "recognition sequence," the "nuclease target site," or the "target site." In some embodiments, a nuclease recognizes a single stranded target site and cleave a single strand of DNA, while in other embodiments, a nuclease recognizes a double-stranded target site, for example a double-stranded DNA target site and cleave both strands of DNA to produce a double stranded break (DSB). The target sites of many naturally occurring nucleases, for example, many naturally occurring DNA restriction endonucleases, are well known to those of skill in the art. In many cases, a DNA restriction endonuclease, such as EcoRI, HindIII, or BamHI, recognize a palindromic, double-stranded DNA target site of 4 to 10 base pairs in length, and cut each of the two DNA strands at a specific position within the target site. Some endonucleases cut a double-stranded nucleic acid target site symmetrically, i.e., cutting both strands at the same position so that the ends comprise base-paired nucleotides, also referred to herein as blunt ends. Other endonucleases cut a double-stranded nucleic acid target sites asymmetrically, i.e., cutting each strand at a different position so that the ends comprise unpaired nucleotides. Unpaired nucleotides at the end of a double-stranded DNA molecule are also referred to as "overhangs," e.g., as "5'-overhang" or as "3'-overhang," depending on whether the unpaired nucleotide(s) form(s) the 5' or the 3' end of the respective DNA strand. Double-stranded DNA molecule ends ending with unpaired nucleotide(s) are also referred to as sticky ends, as they can "stick to" other double-stranded DNA molecule ends comprising complementary unpaired nucleotide(s). A nuclease protein typically comprises a "binding domain" that mediates the interaction of the protein with the nucleic acid substrate, and also, in some cases, specifically binds to a target site, and a "cleavage domain" that catalyzes the cleavage of the phosphodiester bond within the nucleic acid backbone. In some embodiments a nuclease protein can bind and cleave a nucleic acid molecule in a monomeric form, while, in other embodiments, a nuclease protein has to dimerize or multimerize in order to cleave a target nucleic acid molecule. Binding domains and cleavage domains from different naturally occurring nucleases, as well as modular binding domains and cleavage domains that can be fused to create nucleases binding specific target sites, and single guide RNA binding domains and Cas cleavage domains, are well known to those of skill in the art. For example, zinc fingers or transcriptional activator like elements (TALE) can be used as binding domains to specifically bind a desired target site, and fused or conjugated to a heterologous cleavage domain, for example, the cleavage domain of FokI nuclease, to create an engineered nuclease cleaving the target site.

The term "homing endonuclease," as used herein, refers to a type of restriction enzymes typically encoded by introns or inteins. See Edgell D R (February 2009). "Selfish DNA: homing endonucleases find a home". Curr Biol 19 (3): R115-R117; Jasin M (June 1996). "Genetic manipulation of genomes with rare-cutting endonucleases". Trends Genet. 12 (6): 224-8; Burt A, Koufopanou V (December 2004). "Homing endonuclease genes: the rise and fall and rise again of a selfish element". Curr Opin Genet Dev 14 (6): 609-15. Homing endonuclease recognition sequences are long enough to occur randomly only with a very low probability (approximately once every $7\times10^{10}$ bp), and are normally found in only one instance per genome.

The terms "patient" or "subject" are used interchangeably to refer to a human or a non-human animal (e.g., a mammal).

The terms "treat", "treating", treatment" and the like refer to a course of action (such as administering a nuclease) initiated after a disease, disorder or condition, or a symptom thereof, has been diagnosed, observed, and the like so as to eliminate, reduce, suppress, mitigate, or ameliorate, either temporarily or permanently, at least one of the underlying causes of a disease, disorder, or condition afflicting a subject, or at least one of the symptoms associated with a disease, disorder, condition afflicting a subject.

The terms "prevent", "preventing", "prevention" and the like refer to a course of action (such as administering a nuclease) initiated in a manner (e.g., prior to the onset of a disease, disorder, condition or symptom thereof) so as to prevent, suppress, inhibit or reduce, either temporarily or permanently, a subject's risk of developing a disease, disorder, condition or the like (as determined by, for example, the absence of clinical symptoms) or delaying the onset thereof, generally in the context of a subject predisposed to having a particular disease, disorder or condition. In certain instances, the terms also refer to slowing the progression of the disease, disorder or condition or inhibiting progression thereof to a harmful or otherwise undesired state.

The phrase "therapeutically effective amount" refers to the administration of an agent to a subject, either alone or as a part of a pharmaceutical composition and either in a single dose or as part of a series of doses, in an amount that is capable of having any detectable, positive effect on any symptom, aspect, or characteristics of a disease, disorder or condition when administered to a patient. The therapeutically effective amount can be ascertained by measuring relevant physiological effects.

Methods

In certain aspects, a method for detecting induction of cleavage in genomic DNA by a nuclease is disclosed. The method comprises contacting a live cell comprising genomic DNA comprising a cleavage site for the nuclease with the nuclease under conditions sufficient for induction of cleavage at the cleavage site. The method further includes fixing the cell and contacting the fixed cell with a plurality of oligonucleotides complementary to a single stranded (ss) 3'-overhang created at the cleavage site, where the genomic DNA is not denatured and detecting hybridization of the plurality of oligonucleotides to the ss 3'-overhang, where hybridization of the oligonucleotides indicates induction of the cleavage by the nuclease.

In certain aspects, the cleavage site may be an on-target cleavage site. As used herein, the term, "on-target" cleavage site refers to a genomic sequence that is the target of the nuclease. In certain aspects, the nuclease includes a DNA binding domain (DBD) and a cleavage domain. The DBD determines the specificity of the nuclease for the cleavage site. An on-target cleavage site refers to a nucleic acid sequence that includes the DNA sequence specifically bound by the DBD of the nuclease. For example, the DBD may be an engineered DBD having repeats, motifs, or nucleotide sequence arranged to specifically bind to a target nucleic acid sequence and the cleavage domain may induce a break in the DNA at a site within or adjacent the target nucleic acid sequence.

In certain aspects, the cleavage site may be an off-target cleavage site. As used herein, the term, "off-target" cleavage site refers to a genomic sequence that is not the target of the nuclease but is cleaved by the nuclease due to non-specific binding of the DBD of the nuclease to a sequence of the off-target cleavage site. In certain aspects, an off-target cleavage site may be a known or a predicted off-target cleavage site. In certain aspects, an off-target cleavage site may be predicted by identifying sequences in the genome that are highly similar to the sequence of the on-target cleavage site. In certain aspects, an off-target cleavage site may be a nucleic acid sequence having a difference of two or more, e.g., 2-7 nucleotides from the nucleic acid sequence of the target cleavage site.

In certain aspects, the plurality of oligonucleotides used in the presently described methods are complementary to a single stranded (ss) 3'-overhang created at the cleavage site. Since the oligonucleotides bind single stranded DNA, a step of denaturing the genomic DNA to generate single stranded DNA prior to contacting the cell with the oligonucleotides is not required. Furthermore, since the method is for detecting presence of ss 3'-overhang created at the cleavage site, a step of denaturing the genomic DNA to generated single stranded DNA is not conducted to avoid detection of ss DNA generated from denaturation. As used herein, the phrase, "genomic DNA is not denatured" means that the genomic DNA is not subjected to conditions that would result in substantial denaturation, such that more than 500 base pairs long region in the genomic DNA is no longer base paired. In certain aspects, the steps of the disclosed method do not involve subjecting the cell to treatments that would result in substantial denaturation of the genomic DNA. For example, the cell is not subjected to a temperature of at least 90° C. for at least 30 seconds and is not exposed to a denaturing agent in an amount and under conditions sufficient to cause substantial denaturation, such that more than 500 base pairs long region in the genomic DNA is no longer base paired.

As used herein, the term ss 3'-overhang refers to an extended single stranded region of DNA created at the site of cleavage by a nuclease from a process of 5' to 3' re-sectioning of the bottom strand at the cleavage site and/or 5' to 3' re-sectioning of top strand at the cleavage site. In certain aspects, the 5' to 3' re-sectioning may start immediately adjacent the site where the cleavage has occurred, e.g., at the 5'-most base located at the 5'end created from the cleavage. In other aspects, the 5' to 3' re-sectioning may start adjacent the site where the cleavage has occurred, e.g., at a base located about 10, 30, 100, 300, or more, e.g., up to 700 nucleotides away from the 5'end created from the cleavage. Thus, the ss 3'-overhang may include short region(s) of double stranded DNA where the 5' to 3' re-sectioning did not occur. For example, the ss 3'-overhang may be about 1 kb-10 kb long and may include a double stranded region immediately adjacent the site of cleavage. While in certain aspects, ss 3'-overhang may include double stranded region(s), e.g., immediately adjacent the site where the cleavage has occurred, at least 50% or more, e.g., at least 60%, at least 70%, at least 80%, at least 90%, at least 95%, at least 96%, at least 97%, at least 98%, at least 99%, or up to 100% of the ss 3'-overhang may be single stranded. Thus, the phrase "at the site of cleavage" as used in the context of the ss 3'-overhang refers to an extended single stranded region of DNA created by a nuclease from a process of 5' to 3' re-sectioning of the bottom and/or top strand immediately adjacent the cleavage site or adjacent (e.g., 10, 30, 100, 300, or more, e.g., up to 700 nucleotides away) the cleavage site. In certain aspects, the ss 3'-overhang created as a result of cleavage by the nuclease followed by 5' to 3' re-sectioning as described herein includes an extended continuous single stranded region that may be at least 500 nucleotides in length, e.g., at least 800 nucleotides in length, at least 1 kilobase (kb) in length, e.g., 500 bases-50 kb, 500 bases-40 kb, 500 bases-30 kb, 500 bases-20 kb, 500 bases-10 kb, 500 bases-5 kb, 500 bases-1 kb, 1 kb-50 kb, 1 kb-40 kb, 1 kb-30 kb, 1 kb-20 kb, 1 kb-10 kb, or 1 kb-5 kb in length. In certain aspects, the ss 3'-overhang may be referred to as an extended ss 3'-overhang or a long ss 3'-overhang. It is noted that the ss 3'-overhang is distinct from a 3'-overhang that can be created by asymmetric cleavage by a nuclease because the ss 3'-overhang is substantially longer than the 3'-overhang created by asymmetric cleavage by a nuclease. In addition, the length of the 3'-overhang that can be created by asymmetric cleavage by a nuclease is insufficient for detection by hybridizing an oligonucleotide to the 3'-overhang. Therefore, the ss 3'-overhang detected by the methods disclosed herein is not an overhang created by an asymmetric DNA cleavage by a nuclease.

In certain aspects, cleavage by the nuclease may be asymmetric resulting in production of 5'-overhangs, i.e., the single-stranded bases produced from the double stranded break end with a 5' phosphate and occur in the bottom and tops strands. 5' to 3' re-sectioning of the bottom strand at the cleavage site (e.g., immediately adjacent the cleavage site or 10, 30, 100, 300, or more, e.g., up to 700 nucleotides away from the cleavage site) removes this 5'overhang and/or 5' to 3' re-sectioning of top strand at the cleavage site (e.g., immediately adjacent the cleavage site or 10, 30, 100, 300, or more, e.g., up to 700 nucleotides away from the cleavage site) removes this 5'overhang, resulting in formation of the ss 3'-overhang(s), as described herein. A schematic illustrating a nuclease producing a double strand break with 5'-overhangs, 5' to 3' re-sectioning of the 5'-overhangs resulting in formation of the ss 3'-overhang, and detection of one or both of the ss 3'-overhangs by hybridization with oligonucleotides that are complementary to the ss 3'-overhang(s) is illustrated in FIG. 1. In FIG. 1, the 5' to 3' strand (5'→3') towards the top of the figure is referred to as the top strand or the (+) strand and the 3' to 5' strand (3'←5') strand of DNA towards the bottom of the figure is referred to as the bottom strand or the (−) strand.

In certain aspects, the nuclease may a cut a double-stranded nucleic acid target site symmetrically, i.e., cutting both strands at the same position so that the ends comprise base-paired nucleotides, also referred to herein as blunt ends. In certain aspects, such a cleavage may be detected after 5' to 3' re-sectioning of the bottom strand upstream of the cleavage site and/or 5' to 3' re-sectioning of top strand downstream of the cleavage site which results in formation of the ss 3'-overhang(s). In certain aspects, the nuclease that produces a DSB with blunt ends may be a CRISPR-Cas complex.

In certain aspects, the nuclease used in the subject method may be an endonuclease that produces an asymmetrical or a symmetrical double strand break in a double-stranded nucleic acid target site. In certain aspects, the nuclease may be Zinc-finger protein nuclease (ZFPN), a transcription activator-like effector nuclease (TALEN), a megaTAL, a meganuclease, or a CAS nuclease.

In certain aspects, the nuclease may be an engineered or a recombinant nuclease that includes a DNA binding domain (DBD) and a heterologous DNA cleavage domain. Such nucleases are further described herein.

In certain aspects, the step of contacting the live cell with a nuclease involves introducing the nuclease into the cell. In other aspects, the step of contacting the live cell with a nuclease involves introducing a nucleic acid encoding the nuclease into the cell. In certain aspects, the nucleic acid may be a mRNA or a vector encoding the nuclease. Any method suitable for introducing a protein or a nucleic acid into a cell may be utilized. Such methods may include injection, infection, transfection, and vesicle or liposome mediated delivery.

In certain aspects, the nuclease may be a complex formed from a first polypeptide and a second polypeptide that dimerize to form an active cleavage domain, and the step of contacting the live cell may involve introducing the first polypeptide and the second polypeptide into the cell. In certain aspects, the nuclease may be formed of a first polypeptide and a second polypeptide that dimerize to form an active cleavage domain, and the step of contacting the live cell may involve introducing a nucleic acid encoding both polypeptides or a first nucleic acid encoding the first polypeptide and a second nucleic acid encoding the second polypeptide. In certain aspects, the nuclease may be formed from a complex of single guide RNA and Cas protein and the introducing may involve introducing one of: a DNA encoding the sgRNA and the sgRNA; and one of a nucleic acid encoding Cas or the Cas polypeptide. In certain aspects, the nuclease may include (i) a CRISPR/Cas guide RNA, or a DNA encoding the CRISPR/Cas guide RNA; (ii) a CRISPR/CAS RNA-guided polypeptide (e.g., Cas9, CasX, CasY, Cpf1, and the like), or a nucleic acid molecule encoding the RNA-guided polypeptide (e.g., DNA or RNA such as a plasmid or mRNA). In certain aspects, the CRISPR/Cas system includes an inactivated Cas that does not have cleavage activity but is fused to another endonuclease, e.g., a FokI.

After introduction of the nuclease(s), the cell may be incubated for a period of time sufficient for: (i) transcription and/or translation or translation of the nuclease, if needed; (ii) cleavage at the cleavage site; and (iii) 5' to 3' re-sectioning at cleavage site to generate the ss 3'-overhang(s). In certain aspects, the cell may be incubated for at least about 1 hr to upto about 100 hrs, e.g., 2 hrs-96 hrs, 3 hrs-84 hrs, 4 hrs-72 hrs, 6 hrs-60 hrs, 6 hrs-48 hrs, 3 hrs-48 hrs, 3 hrs-60 hrs, 12 hrs-96 hrs, 12 hrs-60 hrs, 6 hrs-36 hrs, 12 hrs-36 hrs, 3 hrs-36 hrs, 12 hrs-24, etc., after the step of contacting with the cell with a nuclease. The incubation time may be adjusted based on a number of factors, such as, whether the nuclease is introduced as a nucleic acid or a protein, the size of the nuclease, the cleavage efficiency of the nuclease, the amount of nuclease, cell type, specificity of the nuclease, the length of ss 3'-overhang to be generated, and the like.

The incubation may be performed under conditions suitable to support physiological processes in the cell, e.g. to support enzymatic activity in the cell. In certain aspects, the incubation may be performed under standard cell culture conditions. In certain aspects, the cells may be in a suspension or adhesion culture at about 37° C. prior to the step of contacting the cell with a nuclease. In certain aspects, after contacting the cell with a nuclease, the cell may be incubated at a temperature of 25° C.-40° C., e.g., 25° C.-40° C., e.g., about 30° C. or about 37° C. prior to fixation. In certain aspects, the cells may be pre-treated prior to introduction of the nuclease. For example, the cells may be T-cells that have been stimulated for at least 48 hrs prior to introduction of the nuclease.

Following the step of introducing the nuclease into the cell, the cell may be fixed to immobilize the nucleic acids within the cell by cross-linking them with the cellular structure and to inactivate proteins in the cell. Any suitable fixation procedure may be followed and such procedure may be modified to optimize fixation of cells. In certain aspects, the cell may be permeabilized to allow entry of the oligonucleotides into the cells. In other aspects, oligonucleotides may be introduced by other means not requiring cell permeabilization. Any suitable permeabilization procedure may be followed and such procedure may be modified to optimize permeabilization of cells.

Following fixation and optional permeabilization of the cell, the method may include contacting the cell with a plurality of oligonucleotides complementary to the ss 3'-overhang created at the cleavage site. The sequence(s) of the plurality of oligonucleotides used in the presently described methods may be selected based on whether the method is for detecting on-target or off-target cleavage, or both. The sequences of the genome of many types of organisms as publicly available may be used for designing the sequences of the oligonucleotides. In certain aspects, the number and sequence(s) of the plurality of oligonucleotides may be determined by the length of the ss 3'-overhang created at the cleavage site. In certain aspects, the plurality of oligonucleotides may include 5-500 oligonucleotides, e.g., 5-500, 5-300, 5-100, 5-50, 5-30, 10-500, 10-300, 10-100, 10-50, or 10-30 oligonucleotides. In certain aspects, the oligonucleotides may have a length of 10-200 bases, e.g., 10-200, 10-100, 10-75, 10-60, or 10-50 bases and may include at least 10, at least 15, at least 20, at least 30, at least 40, or at least 50 nucleotides that are complementary to a sequence present in the ss 3'-overhang. In certain aspects, these complementary nucleotides may be contiguous, i.e., may be present as a stretch of nucleotides uninterrupted by non-complementary nucleotides in the oligonucleotide. In certain aspects, an oligonucleotide may have at least 70% complementarity to a sequence in the ss 3'-overhang over the length of the oligonucleotide. In certain aspects, the plurality of oligonucleotides may be designed such that they tile across a region of the ss 3'-overhang.

In certain aspects, the plurality of oligonucleotides may be complementary to a region within 1000 bases (1 kilobase, kb) from the cleavage site. In certain aspects, as few as 15 oligonucleotides may be sufficient for detecting presence of a 1 kb long ss 3'-overhang. In certain aspects, the plurality of oligonucleotides may be complementary to a region within 1 kb-50 kb from the cleavage site, e.g., within 1 kb-40 kb, 1 kb-30 kb, 1 kb-20 kb, 1 kb-10 kb, or 1 kb-5 kb from the cleavage site.

In certain aspects, the oligonucleotides may have different sequences, where each oligonucleotide binds to a different region in the ss 3'-overhang. In certain aspects, the ss 3'-overhang may have repetitive sequences. In such instances, at least some of the oligonucleotides can have the same sequence.

In certain aspects, the step of contacting the fixed cell with a plurality of oligonucleotides may be performed under conditions sufficient for supporting hybridization of the oligonucleotides to the undenatured DNA in the cell. In certain aspects, the step of contacting the fixed cell with a plurality of oligonucleotides may be performed in in situ hybridization conditions, where the genomic DNA is not substantially denatured. In certain aspects, the in situ hybridization conditions may include incubating the cell in a hybridization buffer which contains certain amount of denaturing agents which amount while sufficient to disrupt non-specific binding of the oligonucleotides to the DNA in the cell is not sufficient to cause substantial denaturation of genomic DNA. In certain aspects, the in situ hybridization conditions may include contacting the cell with the oligonucleotides and incubating the cell at a temperature ranging from 18° C.-50° C., e.g., 22° C.-50° C., 22° C.-40° C., 25° C.-40° C., e.g., about 37° C.

In certain aspects, the method of detecting induction of a DSB at a cleavage site in genomic DNA in a live cell by a nuclease may include detecting a first ss 3'-overhang created in the top strand of the genomic DNA and a second ss 3'-overhang created in the bottom strand of the genomic DNA, at the cleavage site. In such aspects, the method may include contacting the fixed cell with a first and a second plurality of oligonucleotides. The first plurality of oligonucleotides may be a first population of oligonucleotides complementary to the first ss 3'-overhang. The second plurality of oligonucleotides may be a second population of oligonucleotides complementary to the second ss 3'-overhang. In certain aspects, the oligonucleotides of the first and the second plurality of oligonucleotides may be differentially labeled. In certain aspects, the oligonucleotides of the first and the second plurality of oligonucleotides may have the same label.

In certain aspects, a cell may include at least one on-target cleavage site and at least one off-target cleavage site for the nuclease and the method may include detecting the on-target and off-target cleavage induced by the nuclease simultaneously, the method comprising contacting the fixed cells with a first plurality of oligonucleotides complementary to a single stranded (ss) 3'-overhang created at the on-target cleavage site and a second plurality of oligonucleotides complementary to a single stranded (ss) 3'-overhang created at the off-target cleavage site, where the first and second plurality of oligonucleotides are differentially labeled, and detecting hybridization of the first and the second plurality of oligonucleotides to the respective ss 3'-overhangs, where hybridization of the first plurality of oligonucleotides indicates induction of the on-target cleavage by the nuclease, and where hybridization of the second plurality of oligonucleotides indicates induction of the off-target cleavage by the nuclease.

In certain aspects, the method includes decreasing the concentration of the nuclease in the cell when an off-target cleavage is detected. For example, the amount of nuclease or a nucleic acid encoding the nuclease (or components thereof, e.g., the monomers of a dimeric nuclease, the amount of sgRNA and/or Cas) may be titrated such that only on-target cleavages are induced. In certain aspects, the method may include modifying the sequence of the DNA binding domain of the nuclease to prevent or significantly reduce binding of the DBD of the nuclease to the off-target site.

In other aspects, a plurality, e.g. at least two, three, or more, of different nucleases may be simultaneously or sequentially introduced into a live cell. The different nucleases may be ZFNs, TALENs, CRISPR-effector protein complexes, megaTALs, meganucleases, animal pathogen DBDs conjugated to cleavage domains, or combinations thereof.

In some aspects, the step of contacting the live cell comprises contacting the live cell with a first and a second nuclease, where the live cell comprises a first cleavage site for the first nuclease and a second cleavage site for the second nuclease, and where contacting the fixed cell with a plurality of oligonucleotides comprises contacting the fixed cell with a first population of oligonucleotides complementary to a first ss 3'-overhang created at the first cleavage site and with a second population of oligonucleotides complementary to a second ss 3'-overhang created at the second cleavage site, where the first and second populations of oligonucleotides are differentially labeled. In some aspects, the first and second cleavage sites may be on-target cleavage sites. In some aspects, the first and second cleavage sites may be off-target cleavage sites.

In some aspects, the method includes detecting an off-target cleavage induced by the first nuclease, where the live cell comprises an off-target cleavage site for the first nuclease, the method comprising contacting the fixed cells with a third population of oligonucleotides complementary to a single stranded (ss) 3'-overhang created at the off-target cleavage site for the first nuclease, and detecting hybridization of the third population of oligonucleotides to the respective ss 3'-overhang(s), wherein hybridization of the third population of oligonucleotides indicates induction of the off-target cleavage by the first nuclease, wherein the first, second, and third populations of oligonucleotides are differentially labeled.

In some aspects, the method includes detecting an off-target cleavage induced by the second nuclease, where the live cell comprises an off-target cleavage site for the second nuclease, the method comprising contacting the fixed cells with a fourth population of oligonucleotides complementary to a single stranded (ss) 3'-overhang created at the off-target cleavage site for the second nuclease, and detecting hybridization of the fourth plurality of oligonucleotides to the respective ss 3'-overhang(s), where hybridization of the fourth population of oligonucleotides indicates induction of the off-target cleavage by the second nuclease, wherein the first, second, and fourth populations of oligonucleotides are differentially labeled.

In certain aspects, the step of contacting the live cell comprises contacting the live cell with a first, a second, and a third nuclease, wherein the live cell comprises a first cleavage site for the first nuclease, a second cleavage site for the second nuclease, and a third cleavage site for the third nuclease and wherein contacting the fixed cell with a plurality of oligonucleotides comprises contacting the fixed cell with a first population of oligonucleotides complementary to a first single stranded (ss) 3'-overhang created at the first cleavage site, with a second population of oligonucleotides complementary to a second single stranded (ss) 3'-overhang created at the second cleavage site, and a third population of oligonucleotides complementary to a third single stranded (ss) 3'-overhang created at the third cleavage site, wherein the first, second, and third populations of oligonucleotides are differentially labeled. In certain aspects, the first, second, and/or third cleavage sites may be on-target cleavage sites. In certain aspects, the first, second, and/or third cleavage sites may be off-target cleavage sites. In certain aspects, at least one of the first, second, and third cleavage sites is an on-target cleavage site and at least one of the first, second, and third cleavage sites is an off-target cleavage site.

Any representative number of cells may be used in the methods of the present disclosure. Thus, for example, the method may be conducted using a plurality of cells. The cells may be cells from a cell line or from a body sample, e.g., a blood sample or a tissue sample.

The hybridization of the oligonucleotides to ss 3'-overhang may be detected by imaging the cell. In certain aspects, imaging the cell may include acquiring images of the cell by a microscopy mode selected from the group consisting of: epifluorescence, widefield, confocal, selective plane illumination, tomography, holography, super-resolution, and synthetic aperture optics (SAO). In certain aspects, the detection of cleavage sites may be automated. For example, the signals from the oligonucleotides present in the cells may be correlated to a cleavage site and the number of cleavage sites detected per cell quantitated by segmentation of images of the cells.

The imaging process may detect a signal generated from the oligonucleotides hybridized to the ss 3'-overhang. The signal may be generated from a detectable moiety associated with the oligonucleotides. In certain cases, an oligonucleotide may be detected by hybridization of a labeled oligonucleotide. In other cases, the detectable moiety may produce a signal directly or indirectly. One example of a detectable moiety that produces a signal directly is a fluorescent molecule. Detectable moieties that produce a signal indirectly include moieties that produce a signal upon exposure to detection reagents such as substrates or antibodies, etc. A detectable moiety that produces a signal directly can optionally be detected by indirect means such as by using a labeled antibody that binds to the moiety. In certain cases, a signal may be of a particular wavelength which is detectable by a photodetector, e.g., a light microscope, a spectrophotometer, a fluorescent microscope, a fluorescent sample reader, or a florescence activated cell sorter, etc. In certain aspects, the detectable moiety comprises a first member of a specific binding pair and where the detectable moiety is detected by binding a labeled second member of the specific binding pair to the first member. In certain aspects, the specific binding pair comprises biotin/streptavidin or antigen/antibody pair. Other fluorophores include hydroxycoumarin, methoxycoumarin, Alexa fluor, aminocoumarin, Cy2, FAM, Alexa fluor 488, Fluorescein FITC, Alexa fluor 430, Alexa fluor 532, HEX, Cy3, TRITC, Alexa fluor 546, Alexa fluor 555, R-phycoerythrin (PE), Rhodamine Red-X, Tamara, Cy3.5, Rox, Alexa fluor 568, Red 613, Texas Red, Alexa fluor 594, Alexa fluor 633, Allophycocyanin, Alexa fluor 633, Cy5, Alexa fluor 660, Cy5.5, TruRed, Alexa fluor 680, Cy7, GFP, or mCHERRY.

Figure 2:
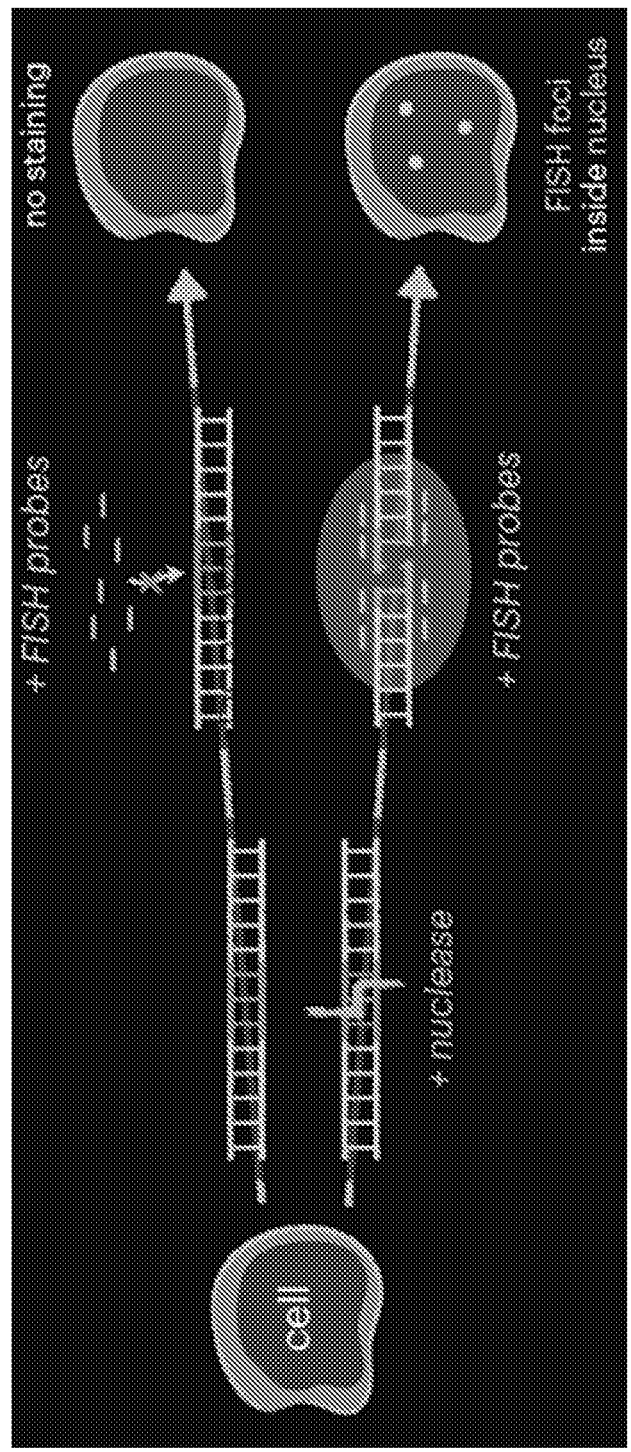
FIG. 2 is a schematic illustrating detection of nuclease induced cleavage by hybridization with detectably labeled oligonucleotides.
Figure 3:
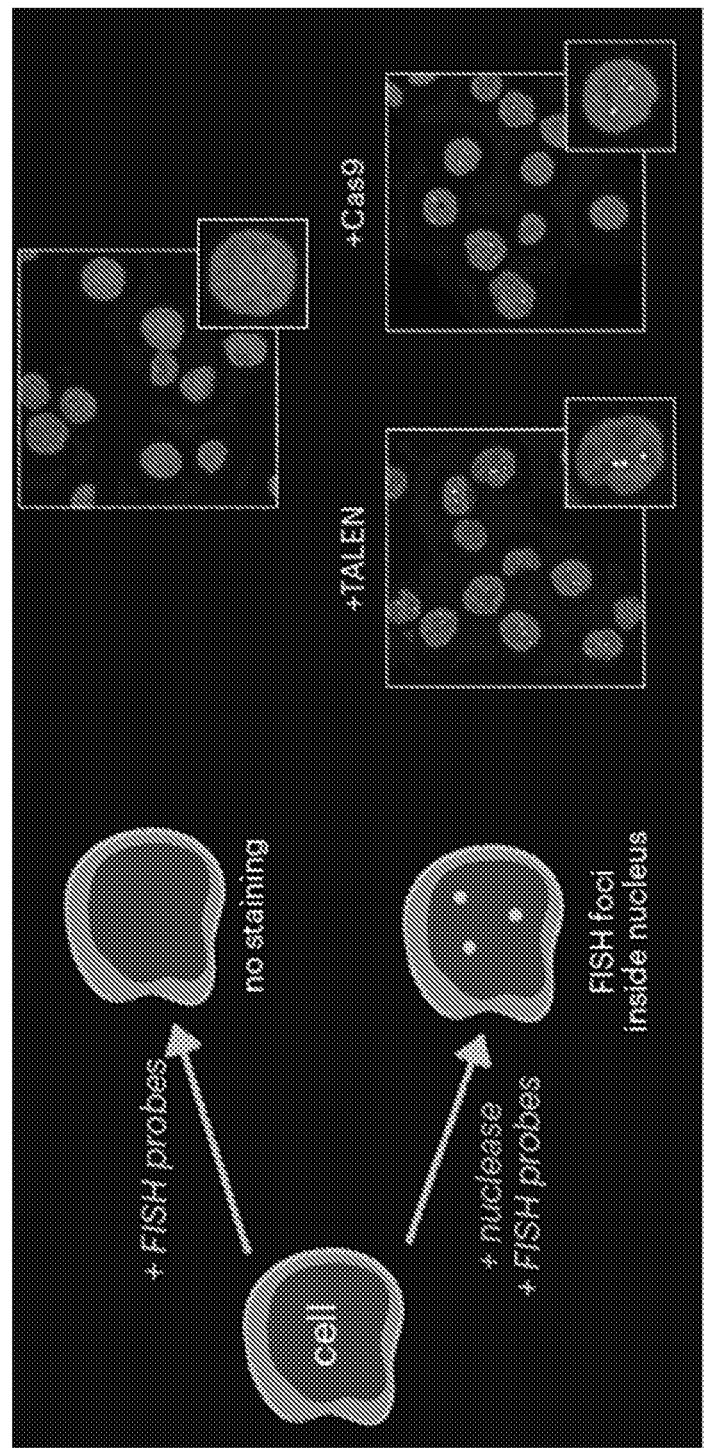
FIG. 3 is a schematic illustrating detection of nuclease induced cleavage by detectably labeled oligonucleotides. The detectably labeled oligonucleotides detected cleavages induced by TALEN and by Cas9.
Figure 4A:
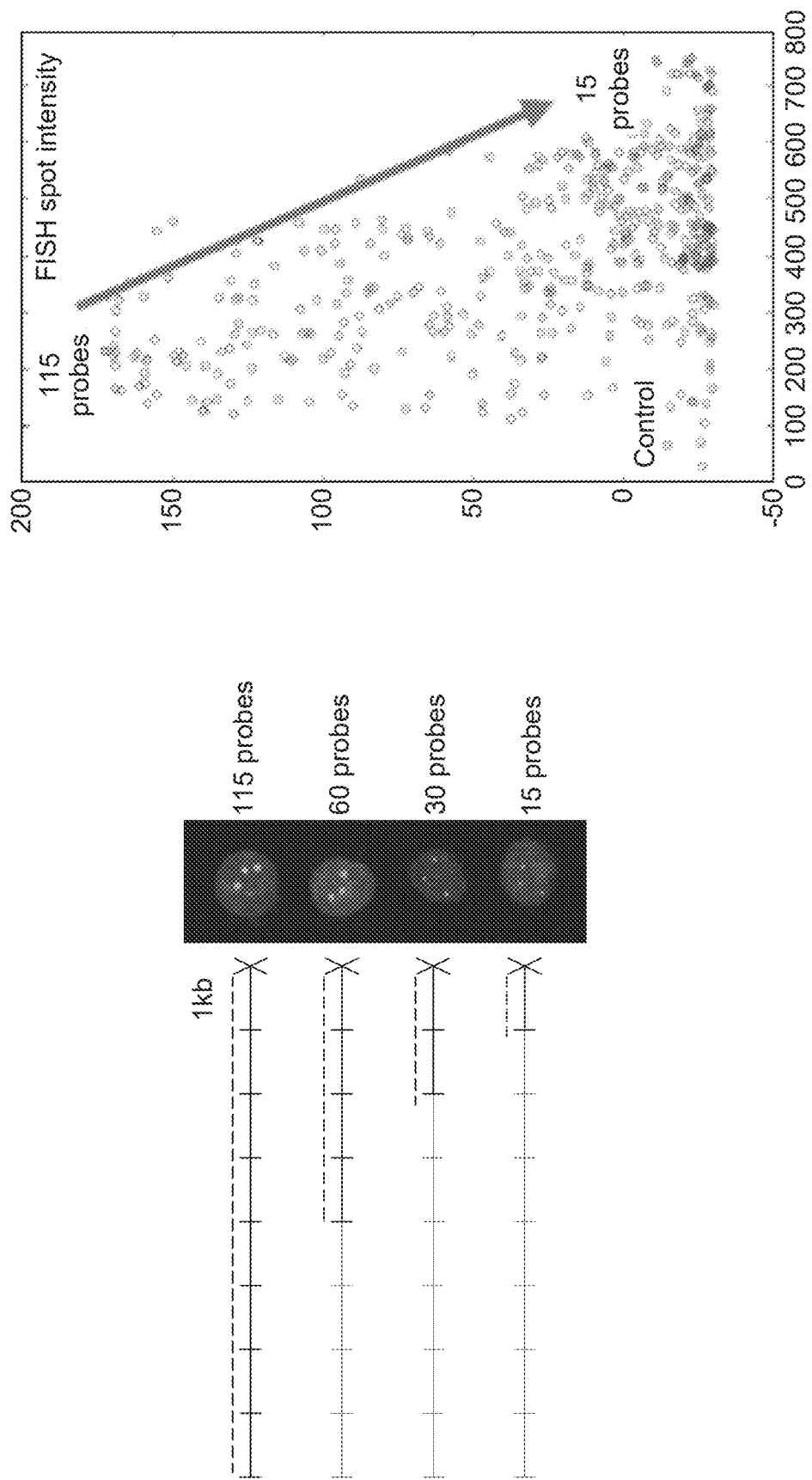
FIGS. 4A-4D illustrate that oligonucleotides hybridized to a region as small as 1 kb provide sufficient signal to detect the nuclease induced cleavage.
Figure 4B:
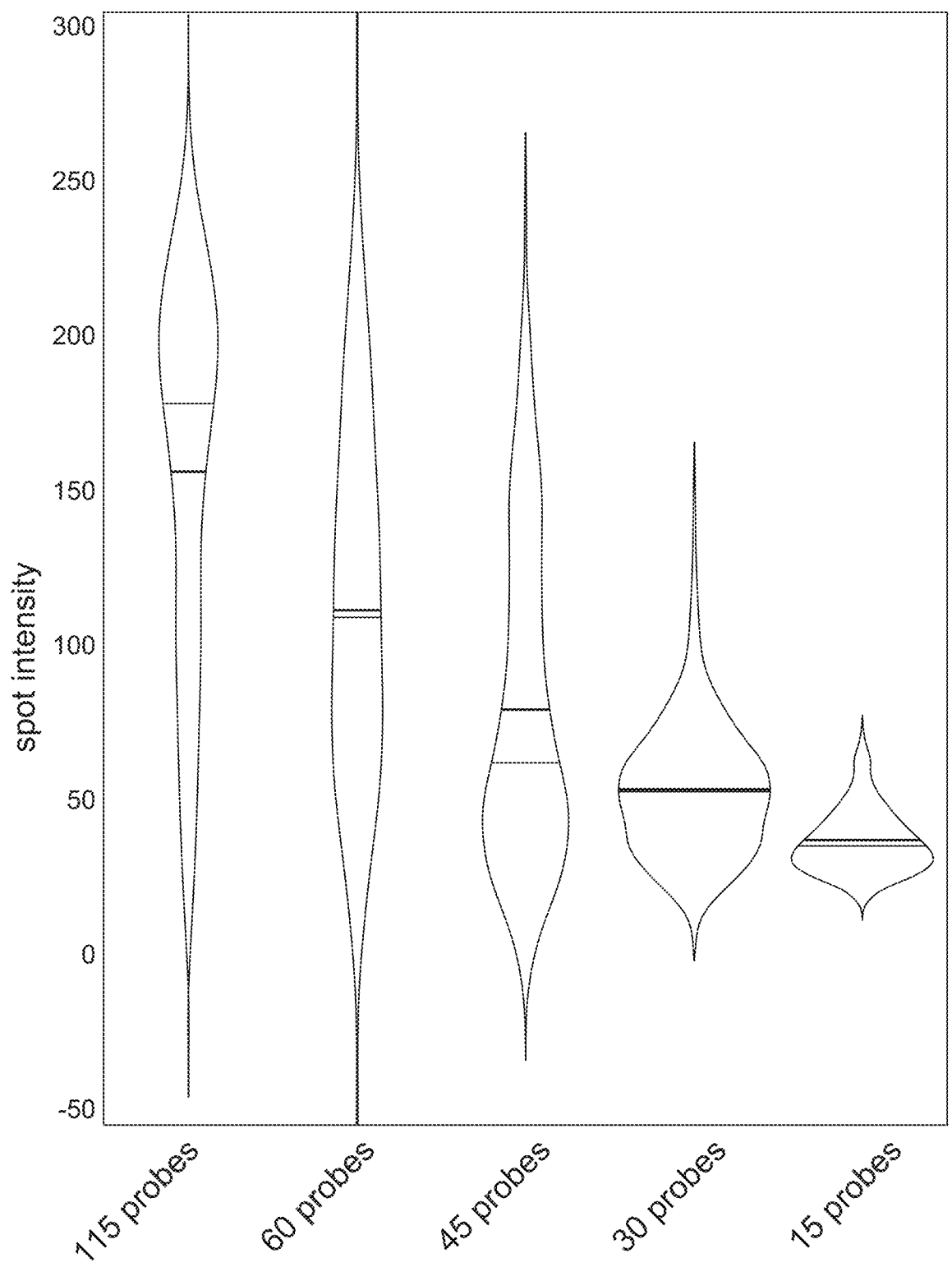
Figure 4C:
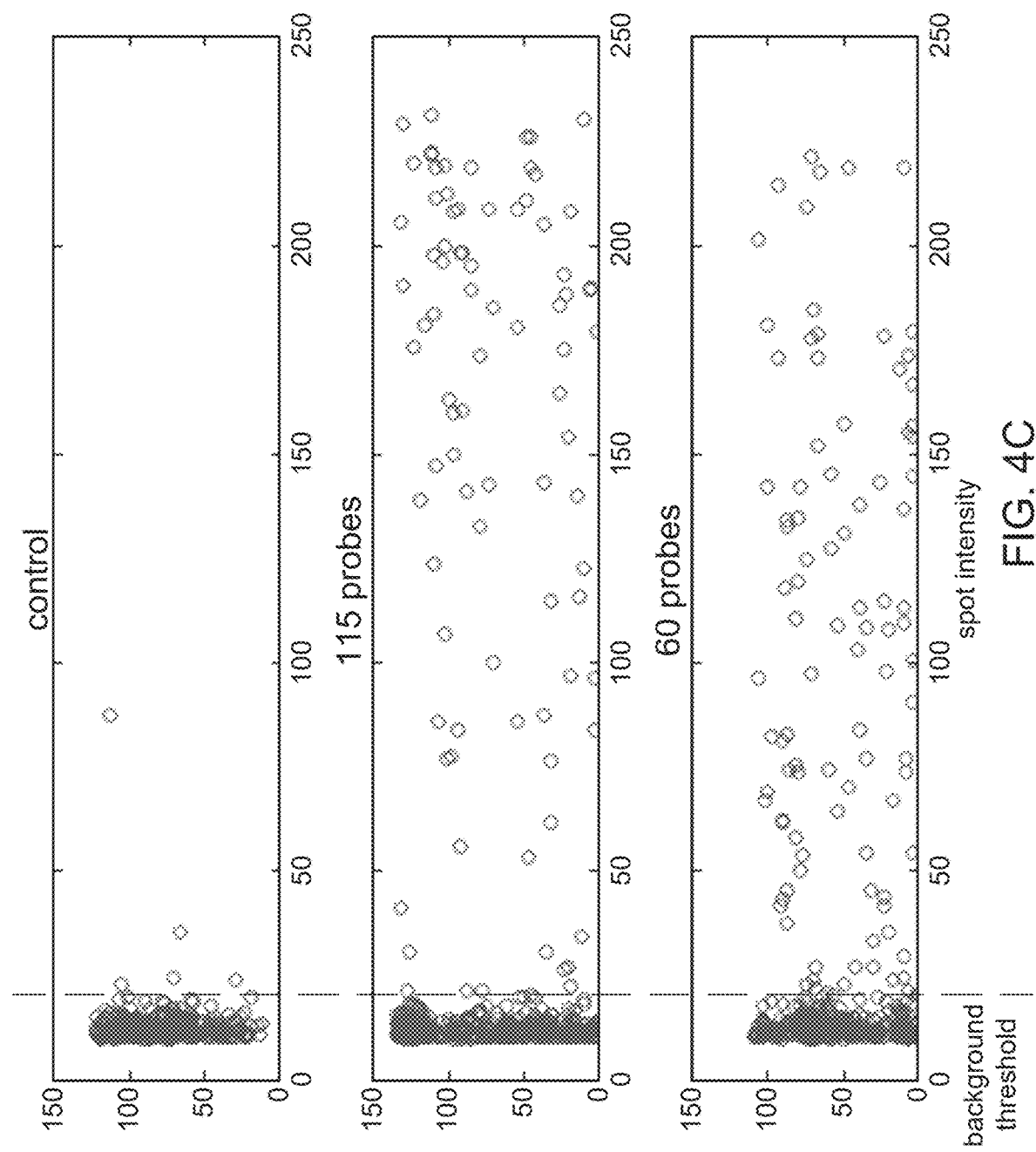
Figure 4D:
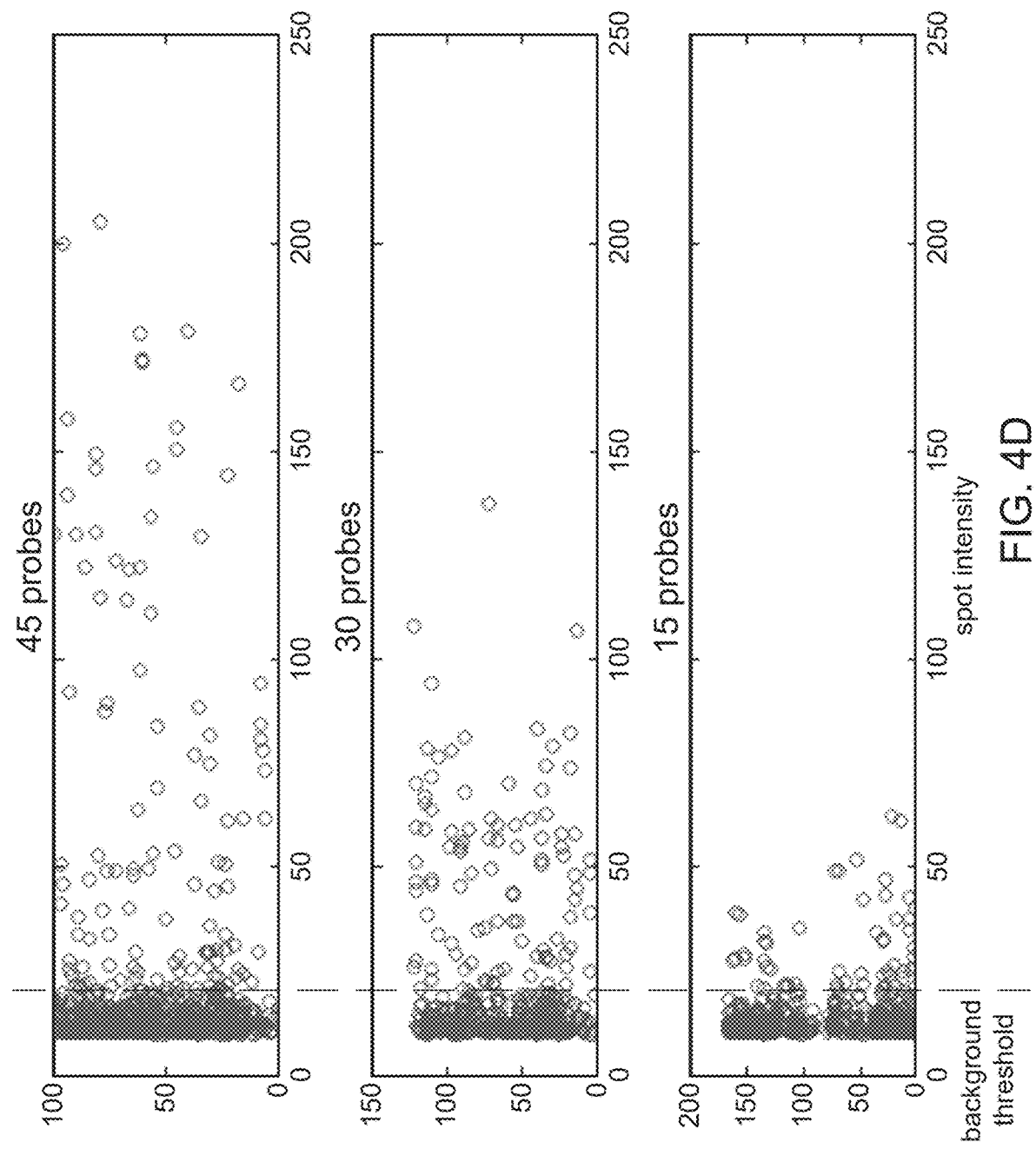

FIG. 2 provides a schematic illustrating detection of nuclease induced cleavage by using labeled oligonucleotides that hybridize to ss 3'-overhang created at the cleavage site. FIG. 3 shows that in absence of the nuclease, the labeled oligonucleotides do not bind to the nucleic acid in the cell, indicating that in the disclosed method, the labeled oligonucleotides do not non-specifically bind to the nucleic acid in the cell.

FIGS. 4A-4D show spot intensity levels produced by different numbers of oligonucleotides used for hybridization. FIGS. 4A-4D illustrate that oligonucleotides complementary to a region of DNA as far as 8 kb from the site of cleavage by a nuclease can be used to detect induction of the cleavage. FIGS. 4A-4D also illustrate that as few as 15 oligonucleotides are sufficient to provide a detectable signal indicating induction of cleavage by the nuclease.

Figure 5:
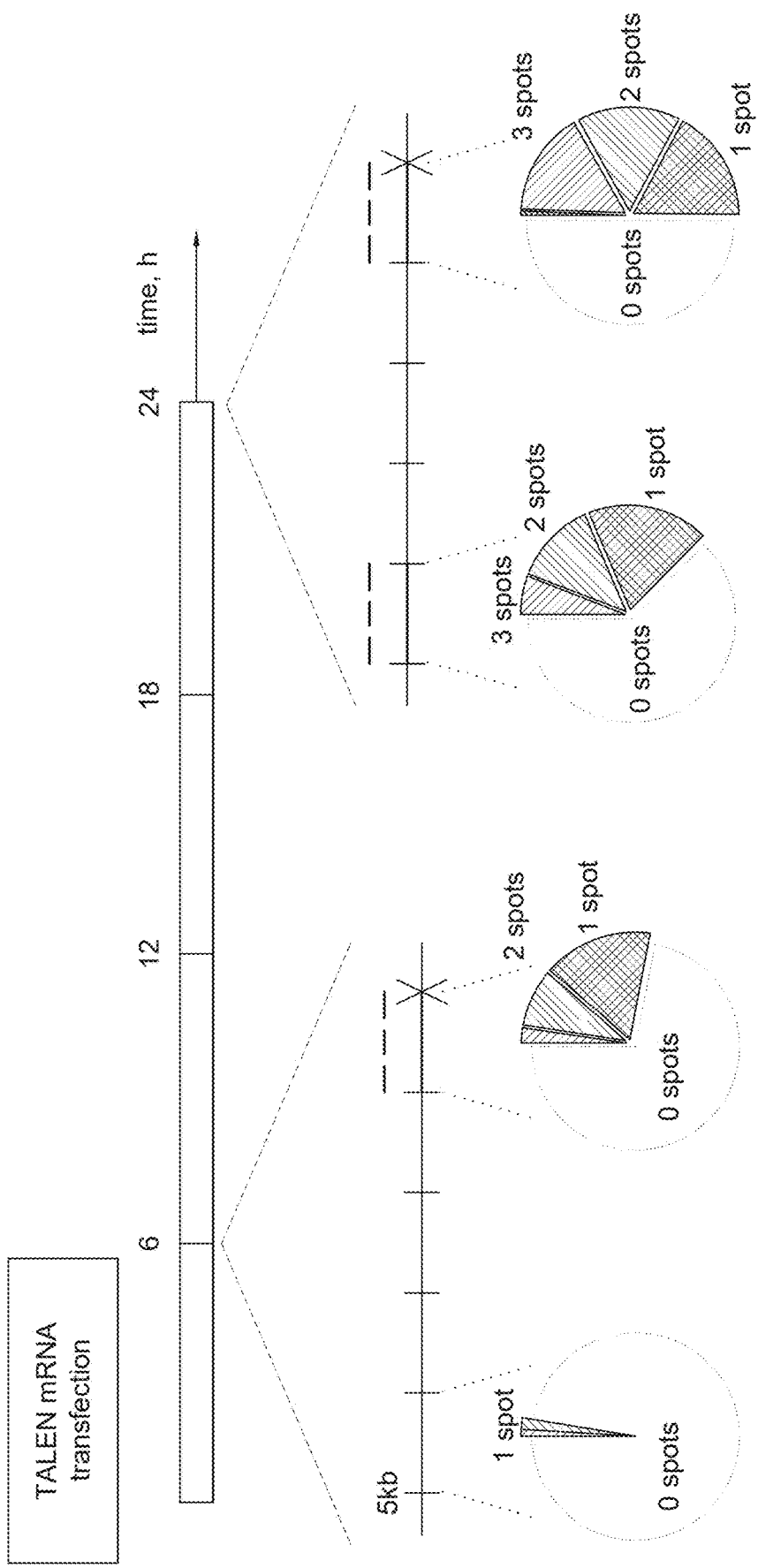
FIG. 5 provides data demonstrating expansion of ss DNA region in the top strand upstream (i.e., 5') of the cleavage site for a time period of at least 24 hours post-transfection of TALEN-encoding mRNA.

FIG. 5 illustrates the expansion of the detectable ss 3'-overhangs over time after transfection. Regions proximal (e.g., immediately adjacent) to nuclease cleavage site become detectable after 6 hrs post-transfection, whereas more distant regions (e.g. 5 kb away) become detectable at later time points, which likely results from slow resection that originates at the cleavage site and progresses outwards. After 24 hrs post-transfection, oligonucleotides that hybridize to a region of the 3'-overhang within 1 kb of the cut-site detect even more nuclease induced cleavages (e.g., 1, 2, and 3 spots) as do the oligonucleotides that hybridize to a region of the 3'-overhang about 5 kb away from the cut-site. In this example, there are 3 cleavage sites (indicated by three spots) per K562 cell (which is triploid).

Figure 6A:
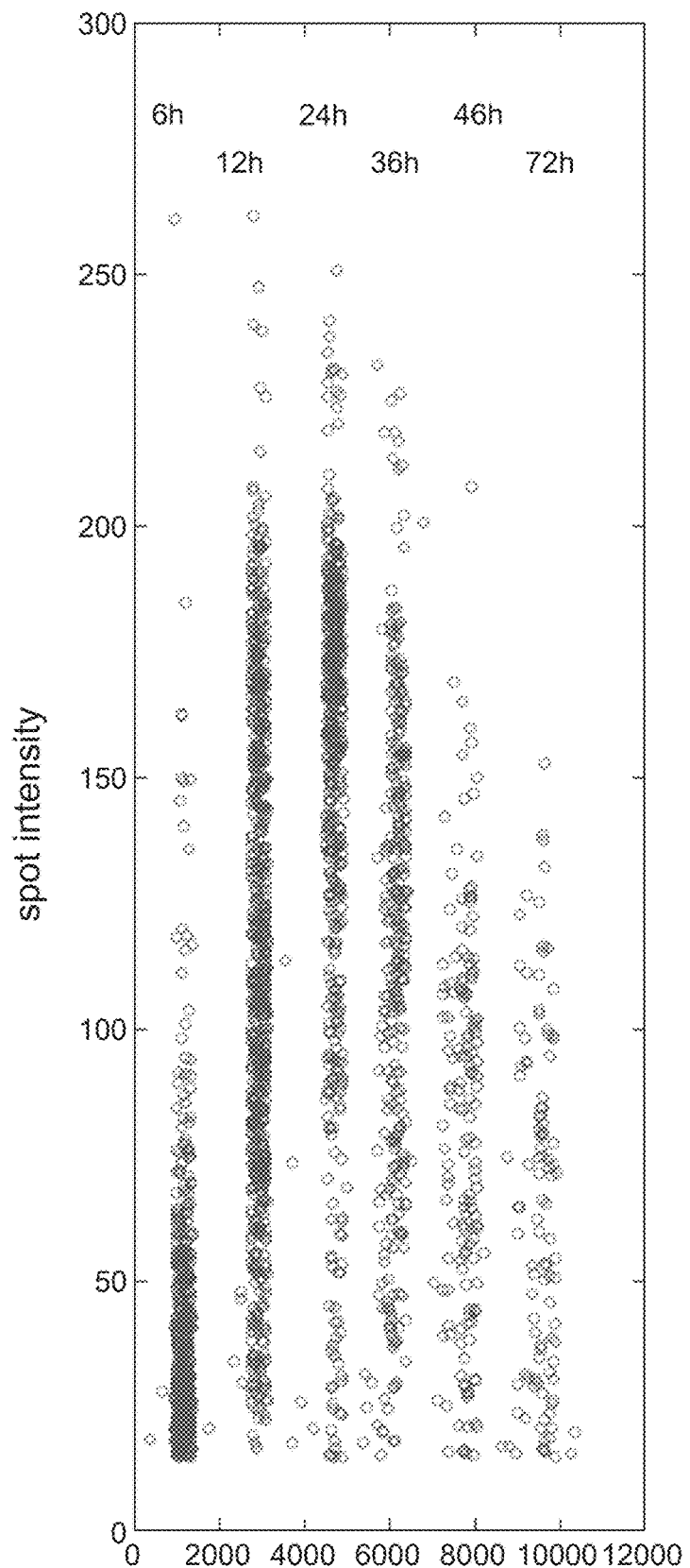
FIG. 6A shows increase in spot intensity reflecting change in the number of oligonucleotides hybridized to ss 3'-overhangs at different time points after introduction of TALEN-encoding mRNA in K562 cells. Spot intensity increased over the span of 6 hrs-24 hrs with a maximum intensity at 12 hrs-24 hrs post-transfection.
Figure 6B:
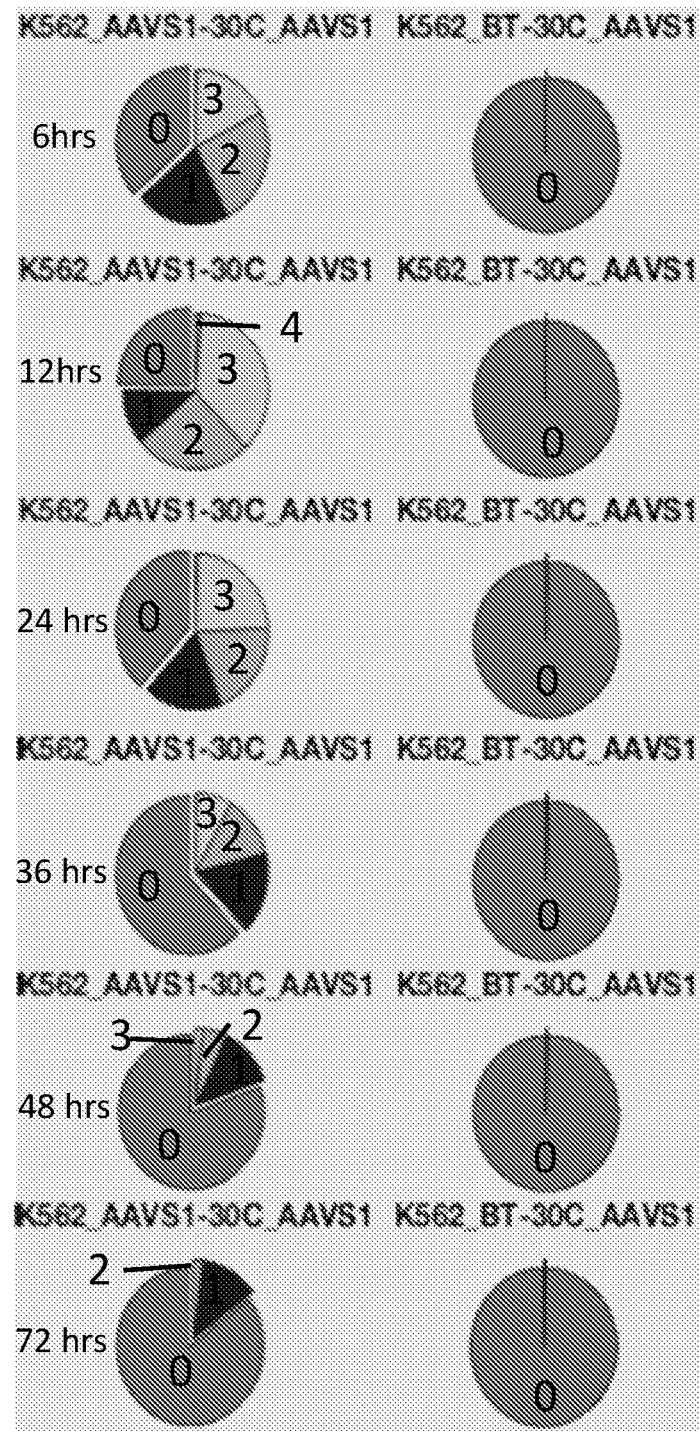
FIG. 6B shows that the numbers of spots per cell, indicative of the number of nuclease induced cleavage introduced at the target site probed by the oligonucleotides in each cell, at different time points after introduction of TALEN-encoding mRNA in K562 cells. Left column represents cells treated with TALEN mRNA. K562_AAVS1-30C_AAVS1 denotes K562 cells transfected with nuclease (introduced as TALEN mRNA) targeting the AAVS1 site, incubated at 30° C. for the indicated time period, and probed with oligonucleotides complementary to a region upstream of the cleavage site in the top strand. Right column represents control cells not treated with TALEN mRNA, K562_BT-30C_AAVS1 denotes K562 cells transfected with a negative control nucleic acid (BT, blank transfection), incubated at 30° C. for the indicated time period, and probed with same oligonucleotides as the cells transfected with TALEN mRNA.
Figure 7A:
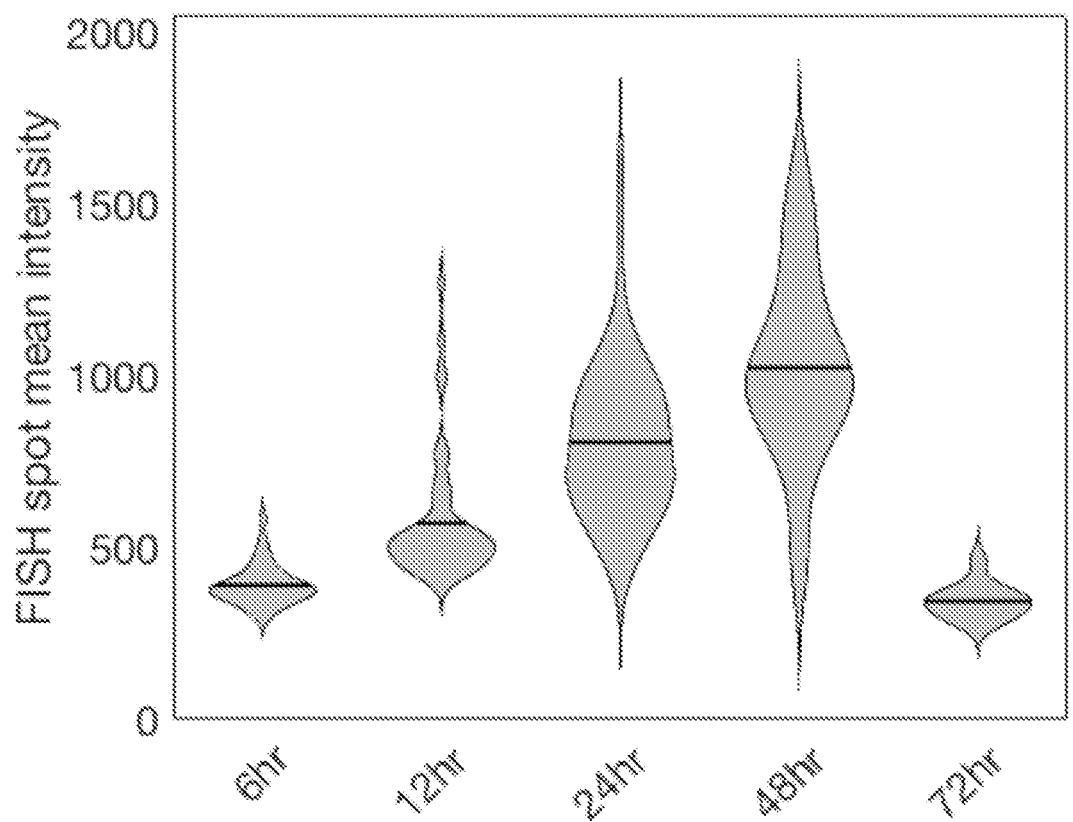
FIG. 7A shows increase in spot intensity reflecting change in the number of oligonucleotides hybridized to ss 3'-overhangs at different time points after introduction of TALEN-encoding mRNA in CD34 cells.
Figure 7B:
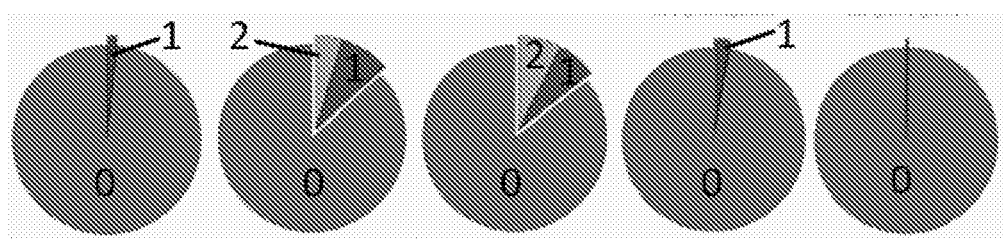
FIG. 7B shows the numbers of spots per cell, indicative of the number of nuclease induced cleavage introduced at the target site probed by the oligonucleotides in each cell.

FIGS. 6A and 7A illustrate that spot intensity increases over the span over several hours post-transfection reaching a maximum at 12-24 hrs post-transfection. Change in spot intensity indicates that the length of ss 3'-overhang at a cleavage site accessible to hybridization is changing with time. FIGS. 6B and 7B illustrate change in the number of detectable spots, which indicates the number of cleavage sites at the indicate time period after introduction of the nuclease.

Figure 8A:
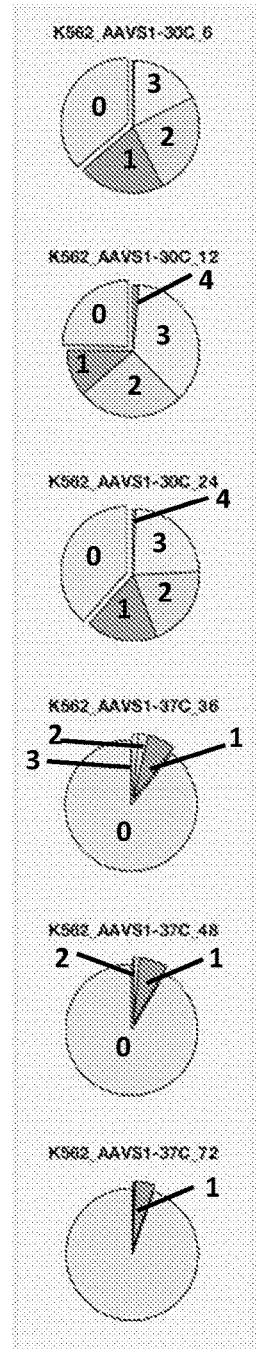
FIG. 8A shows that the number of spots per cell which indicate the number of cleavages peak at 12-24 hrs after introduction of TALEN-encoding mRNA.
Figure 8B:
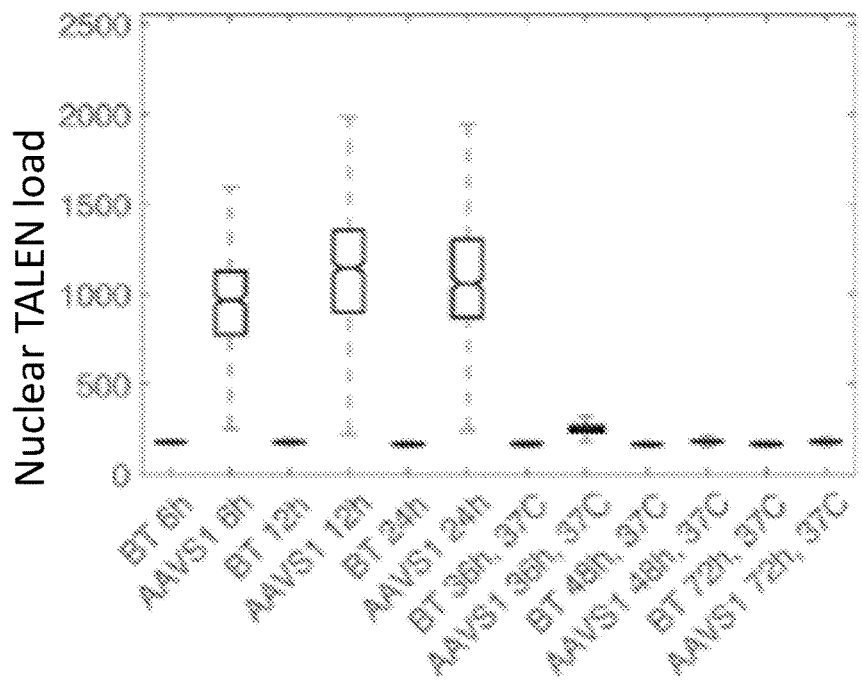
FIG. 8B shows that the time period of increased spot number reflecting the number of cleavages at the probed site, after introduction of TALEN-encoding mRNA correlates with the level of the TALEN expression.
Figure 8C:
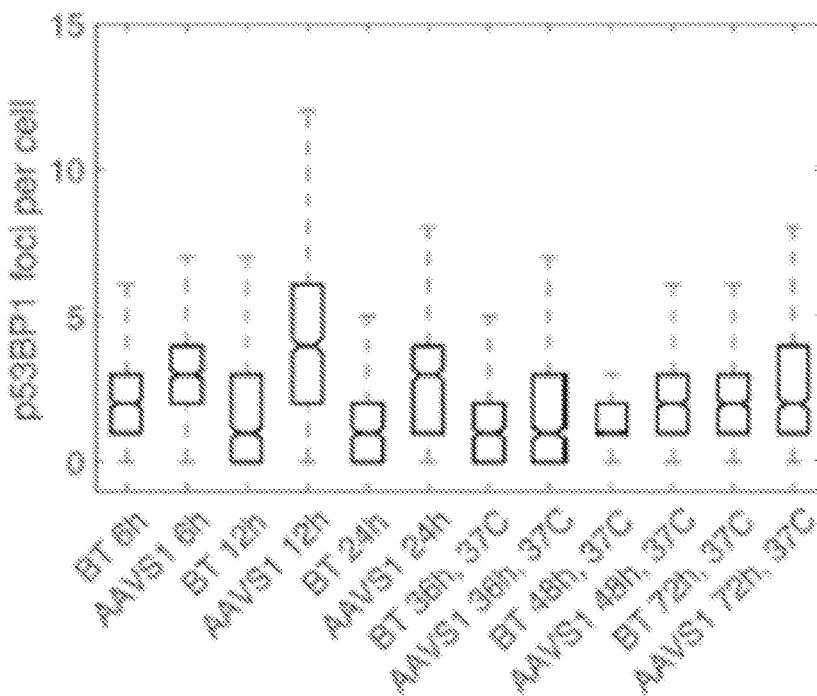
FIG. 8C shows that the time period of increased spot number reflecting the number of cleavages at the probed site, after introduction of TALEN-encoding mRNA correlates with the number of p53BP1 (DNA repair) foci per cell. The cells were cultured at 30° C. for 24 hrs after transfection of TALEN-encoding mRNA and then transferred to 37° C. Aliquots of cells were removed at the indicated time points after transfection of TALEN-encoding mRNA, fixed onto slides and hybridized to oligonucleotides at 37° C. Blank transfection "BT" denotes control cells not transfected with TALEN mRNA, and AAVS1 denotes cells transfected with TALEN mRNA targeting AAVS1 site.
Figure 10:
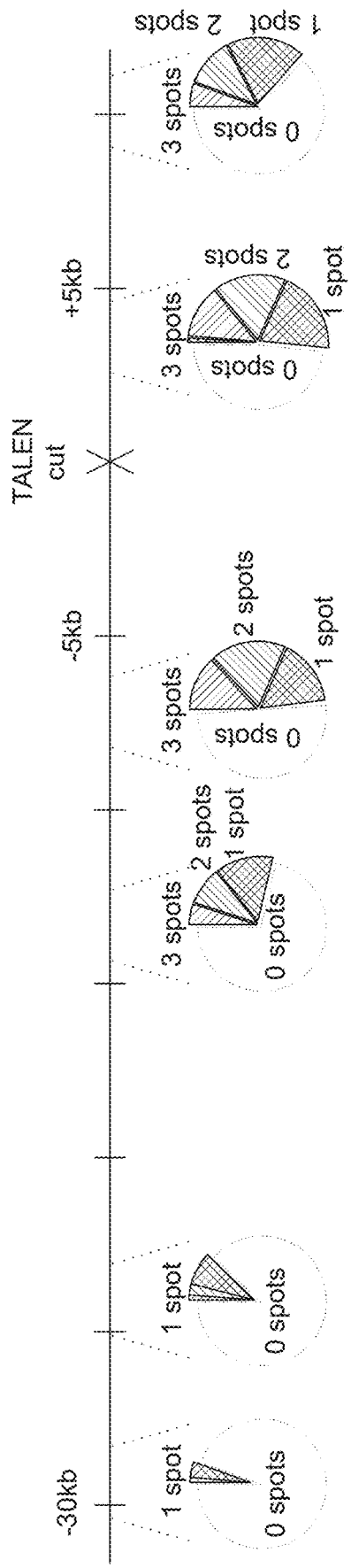
FIG. 10 provides data showing that the ss 3'-overhangs can be about 30 kb in length, with ss 3'-overhangs 5 kb in length being detected consistently.
Figure 11:
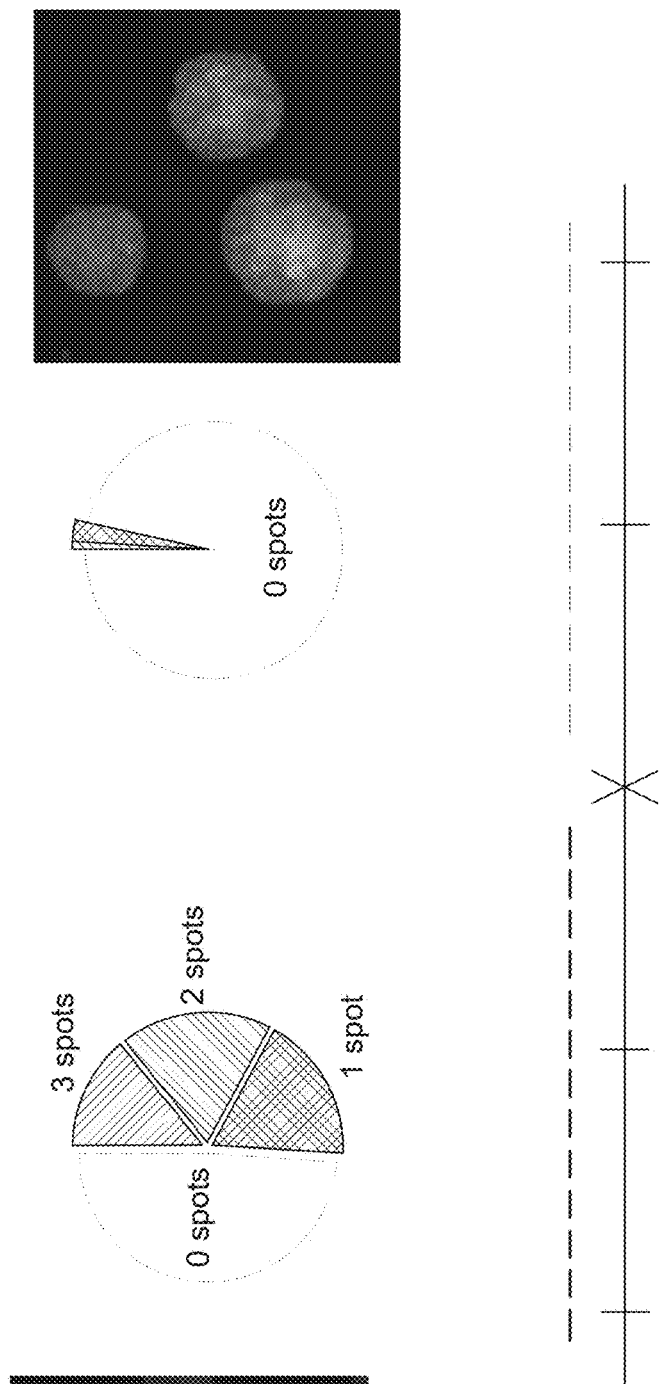
FIG. 11 shows strand-dependency of the labeled oligonucleotide probes. Probes complementary to region in the top strand upstream of the cleavage site provide a signal while probes complementary to the region in top strand downstream of the cleavage site do not.
Figure 13A:
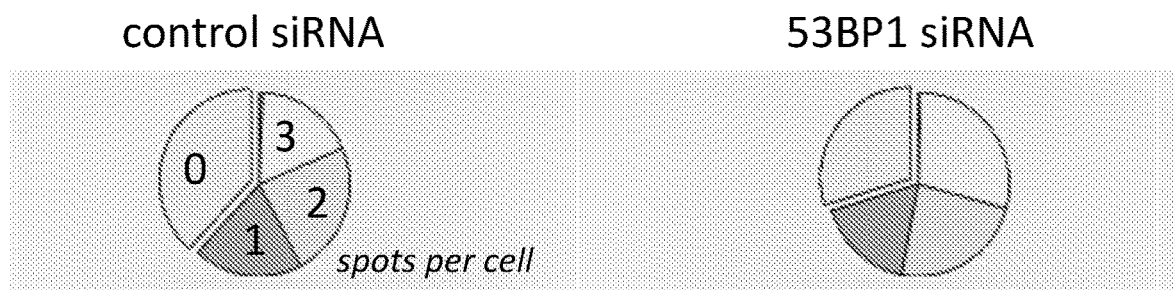
FIG. 13A shows that the silencing of NHEJ pathway proteins increases the number of ss 3'-overhangs detectable after nuclease induced cleavage.
Figure 13B:
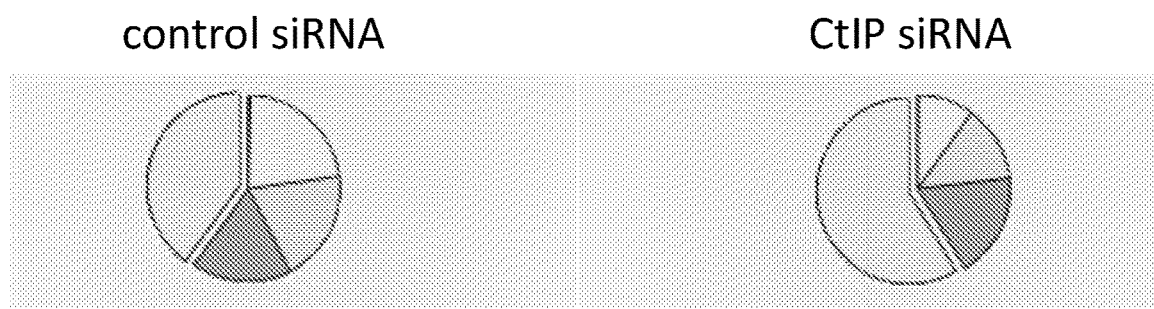
FIG. 13B shows that the silencing of HDR pathway proteins decreases the number of ss 3'-overhangs detectable after nuclease induced cleavage.
Figure 14A:
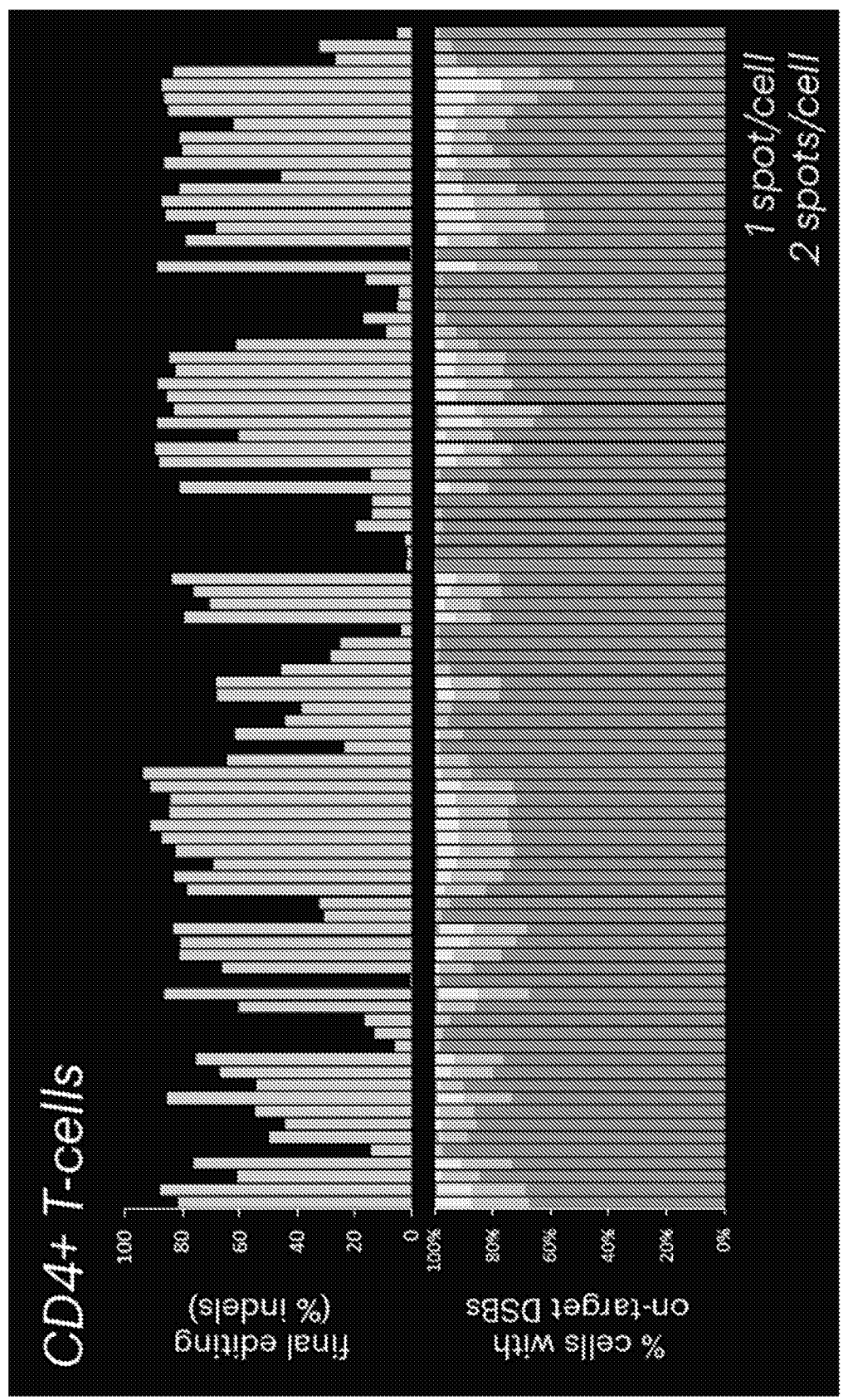
FIGS. 14A and 14B illustrate TALEN mediated editing of CD4 promoter region in CD4+ and CD8+ T-cells.
Figure 14B:
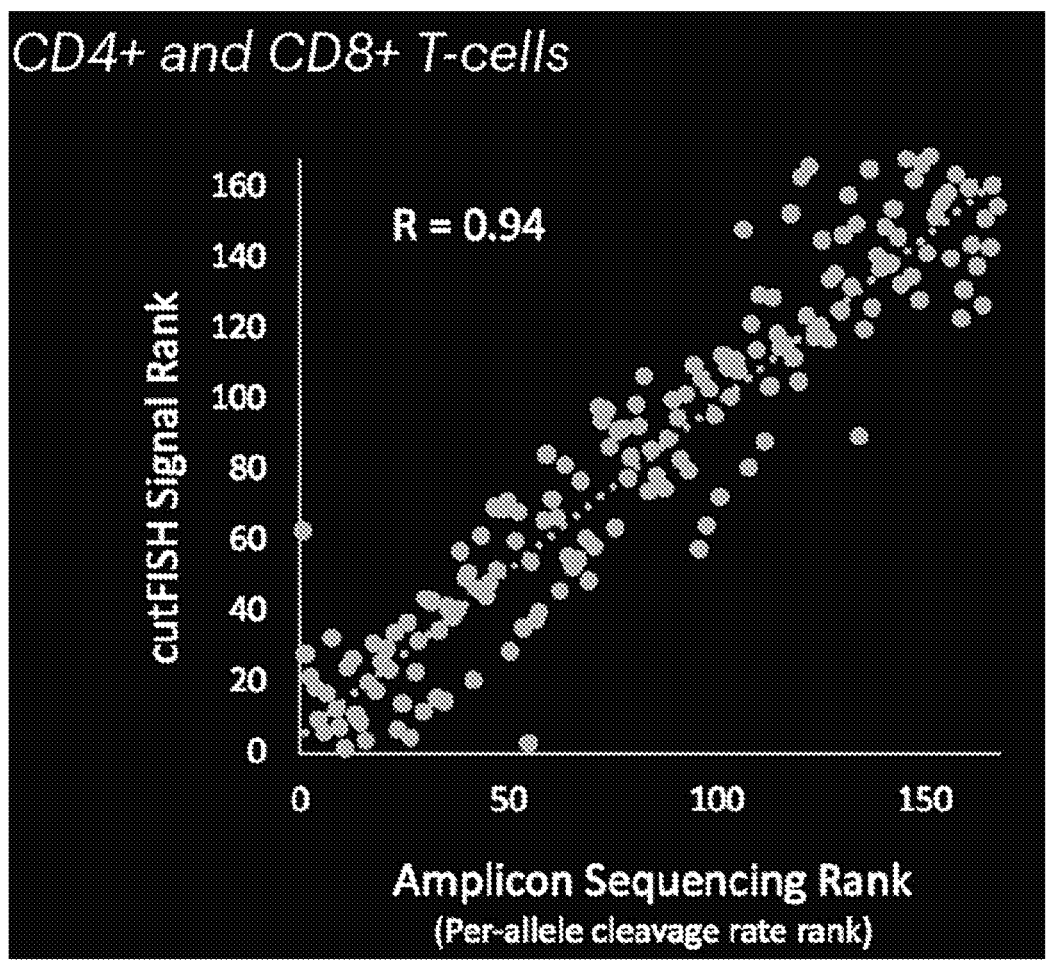

FIG. 8A shows that the number of spots per cell which indicate the number of cleavages, peak at 12-24 hrs after introduction of TALEN-encoding mRNA. FIG. 8B shows levels of the TALEN expression at different time points after introduction of TALEN-encoding mRNA. This data indicates that time period of increased spot number reflecting the number of cleavages at the probed site, after introduction of TALEN-encoding mRNA correlates with the level of the TALEN expression. FIG. 8C shows the number of p53BP1 (DNA repair) foci at different time points after introduction of TALEN-encoding mRNA. This data shows that the time period of increased spot number reflecting the number of cleavages at the probed site, after introduction of TALEN-encoding mRNA correlates with the number of p53BP1 (DNA repair) foci per cell. Cells were cultured at 30° C. for 24 hrs after transfection of TALEN-encoding mRNA and then transferred to 37° C. Cells were hybridized to oligonucleotides at different time points after transfection—6, 12, 24, 36, 48, 72 hrs. For each time point sample treated with AAVS1 TALEN was compared to a control sample not treated with TALEN (blank transfection, or BT).

FIG. 9A shows that the number of spots per cell which indicate with the number of cleavages, peak at 12-24 hrs after introduction of TALEN-encoding mRNA. FIG. 9B shows levels of the TALEN expression at different time points after introduction of TALEN-encoding mRNA. This data indicates that time period of increased spot number reflecting the number of cleavages at the probed site, after introduction of TALEN-encoding mRNA correlates with the level of the TALEN expression. FIG. 9C shows the number of p53BP1 (DNA repair) foci at different time points after introduction of TALEN-encoding mRNA. This data shows that the time period of increased spot number reflecting the number of cleavages at the probed site, after introduction of TALEN-encoding mRNA correlates with the number of p53BP1 (DNA repair) foci per cell. Cells were cultured at 30° C. for 72 hrs after transfection of TALEN-encoding mRNA. Cells were hybridized to oligonucleotides at 37° C. at different time points after transfection—6, 12, 24, 36, 48, 72 hrs. For each time point sample treated with AAVS1 TALEN was compared to a control sample not treated with TALEN (blank transfection, or BT).

In certain aspects, the methods of the present disclosure may additionally include a step of detecting presence or absence of a DSB induced by a nuclease by contacting the cell, contacted with the nuclease, with a binding agent that binds to a DNA repair pathway component, such as, a protein that may be localized to the site of cleavage for inducing DNA repair. In certain aspects, the binding agent may be an antibody that specifically binds to the DNA repair protein localized to the site of cleavage. In certain aspects, the antibody may be detectable directly or indirectly, as is known in the art. In certain aspects, the DNA repair protein detected may be one or more of p53BP1, Ku proteins, Rif1, BRAC1, Ct1P, or Exo1. In certain aspects, the fixed cell may be contacted with the oligonucleotides and one or more binding agents that specifically bind to a DNA repair protein, as disclosed herein, simultaneously and sequentially for, e.g., to determine whether the oligonucleotides and one or more binding agents colocalize in the cell.

Fixation and Hybridization

The cells used in the methods disclosed herein are typically fixed and permeabilized before hybridization of the oligonucleotides, to retain the nucleic acid targets in the cell and to permit the oligonucleotides to enter the cells. The cells may be optionally washed to remove unhybridized oligonucleotides. The cells can be washed after any of various steps, for example, after hybridization of the oligonucleotides to the nucleic acid targets to remove unbound oligonucleotides, after hybridization of the preamplifiers, amplifiers, if used, after binding of antibody, after incubation with substrates detectable moieties and the like.

In some embodiments, the cells are suspension for some, most, or all of the steps of the method, for ease of handling. However, the methods are also applicable to cells in solid tissue samples (e.g., tissue sections) and/or cells immobilized on a substrate (e.g., a slide or other surface). Thus, in some aspects, the cells are in suspension during contacting the cells with a nuclease, and/or the cells are in suspension during the hybridizing and/or detecting steps. For example, the cells can be in suspension during the hybridization, optional washing, and detection steps. In other aspects, the cells are in suspension during the step of contacting with a nuclease, and the cells are fixed on a substrate during the hybridizing and/or detecting steps. In other aspects, the cells are in suspension during the steps of contacting with a nuclease, fixation, permeabilization, hybridization, and optional washing steps and immobilized on a substrate during the detection step.

Fixation of the cells with a fixative reagent and to block the endogenous RNase activities, which can be adapted for use in the present invention. Fixative reagents include formalin (formaldehyde), paraformaldehyde, gluteraldehyde, ethanol, methanol, etc. One common fixative solution for tissue sections includes 0.25% gluteraldehyde and 4% paraformaldehyde in phosphate buffer. Another common fixative solution for tissue sections includes 50% ethanol, 10% formalin (containing 37% formaldehyde), and 5% acetic acid. Different combinations of the fixative reagents at various concentrations are optionally tested to find the optimal composition for fixing cells in suspension, using techniques well known in the art. In certain aspects, the fixative reagent may be 4% formaldehyde in PBS or 3:1 ratio of methanol and glacial acetic acid. Duration of the fixing treatment can also be optimized.

Permeation

In certain aspects, the methods disclosed herein may include a follow-on permeation step to enhance in-cell hybridization. One technique involves the application of heat for varying lengths of time to break the cross-linking. Detergents (e.g., TRITON X-100 or SDS) and Proteinase K can also be used to increase the permeability of the fixed cells. Detergent treatment, usually with TRITON X-100 or SDS, is frequently used to permeate the membranes by extracting the lipids.

Proteinase K is a nonspecific protease that is active over a wide pH range and is not easily inactivated. Optimal concentrations and duration of treatment can be experimentally determined as is well known in the art. A cell washing step can follow, to remove the dissolved materials produced in the permeation step.

Optionally, prior to fixation and permeation, cells in suspension are collected and treated to inactivate RNase and/or to reduce autofluorescence. Other methods of reducing cellular autofluorescence such as trypan blue (Mosiman et al. (1997) "Reducing cellular autofluorescence in flow cytometry: an in situ method" Cytometry 30(3): 151-6) or singly labeled quencher oligonucleotide probe are optionally employed.

Oligonucleotide sequences may be determined based on the location of the nuclease cleavage site. For example, a nuclease may include a DBD that binds to a target sequence in the genomic DNA, the cleavage domain of the nuclease may cleave within or adjacent (e.g., within 20 nucleotides) of the particular sequence. In certain aspects, the nuclease may cleave at an off-target site due to, for example, some sequence similarity between the target sequence and the off-target sequences. The off-target sequence may be predetermined or may be predicted. The cleavage by a nuclease at an on-target and/or at an off-target site may be detected by using oligonucleotides that binds to the ss3'-overhang created after cleavage by the nuclease.

DNA Binding Domains

In certain aspects, the DBD of the nucleases that determine the binding specificity of the nucleases disclosed herein may be a derived from *Xanthomonas*, transcription activator-like effector (TALE) systems, *Ralstonia solanacearum* (modular *Ralstonia* nucleic acid binding domain; RNBD), or an animal pathogen (e.g., *Legionella quateirensis, Burkholderia*, Paraburkholderia, or *Francisella*) (modular animal pathogen nucleic acid binding domain; MAP-NBD), zinc finger proteins (ZFPs), or single-guide RNAs (sgRNAs) from CRISPR-effector proteins systems (e.g., CRISPR-Cas 9 systems).

The DBD can be engineered to bind to a particular target nucleic acid sequence. In some aspects, the DBD can be a modular DBD comprising a plurality of repeat units, where each repeat domain recognizes and binds to a single nucleotide or base pair. Each repeat unit in the plurality of repeat units can be specifically selected to target and bind to a specific nucleic acid sequence, thus contributing to the modular nature of the DBD. In certain aspects, the repeat units may be derived from DNA binding proteins, such as, DNA binding proteins comprising modular repeat units that mediate specific binding to DNA from *Ralstonia solanacearum, Burkholderia*, or Paraburkholderia. In certain aspects, the repeat units may be derived nucleic acid binding proteins identified in animal pathogens, such as a bacterium from the order Legionellales or the genus *Legionella* or *Francisella*. In certain aspects, the TALE can be a protein that is a mutated form of, or otherwise derived from, a protein secreted from *Xanthomonas* bacteria. The repeat unit of a DNA binding protein such as a TALE may include a variable number of about 33-35 amino acid residue repeats. Each amino acid repeat unit recognizes one base pair through two adjacent amino acids (e.g., amino acid positions 12 and 13 of the repeat which are also referred to as repeat-variable diresidue (RVD)). In certain aspects, the DBD may include at least 5, at least 10, at least 15, or more, such as, up to 50 repeat units. In certain aspects, the DBD may be derived from *Xanthomonas* TALE protein avirulence protein AvrBs3 (Uniprot Accession No. P14727) or avirulence protein AvrXa10 (Uniprot Accession No. Q56830). A TAL effector DNA-binding domain can further comprise an N-terminal cap and a C-terminal cap which may be derived from the same TALE from which the repeat units are derived. In certain aspects, the DBD may be as described in or derived from TALEs disclosed in U.S. Pat. Nos. 900,597, 8,586,526, 9,809,628, US20180237758, US20150067900, U.S. Pat. No. 9,902,962, US20180141979, U.S. Pat. Nos. 9,758,775, 8,614,092, US20160273002, U.S. Pat. No. 9,758,797, US20170362612, or US20160060610, which descriptions of TALEs are herein incorporated by reference.

In some aspects, the DBD can be derived from a ZFP. Such a DBD may include four or more adjoined zinc-fingers or zinf finger motifs each targeting three base pairs for a total of at least 12 base pairs recognized. Each zinc finger motif can be about 30 amino acids in length and can fold into a $\beta\beta\alpha$ structure in which the $\alpha$-helix can be inserted into the major groove of the DNA double helix and can engage in sequence-specific interaction with the DNA site. A zinc-finger DNA binding domain of a ZFN can comprise from about 1 to about 10 zinc finger motifs. A zinc-finger DNA binding domain can comprise from about 1 to about 9, from about 2 to about 8, from about 2 to about 6 or from about 2 to about 4 zinc finger motifs.

In some aspects, the DBD can be a single guide RNA having a sequence that specifically binds to a target nucleic acid sequence. The sgRNA can be made of ribonucleotides, deoxyribonucleotides or a combination thereof. The sgRNA can be made of a CRISPR RNA (crRNA) and a trans-activating crRNA (tracrRNA). The sgRNA can comprise at least 18, at least 19, at least 20, at least 21, at least 22, at least 23, at least 24, or at least 25 nucleotides that are complementary to a target sequences of interest. The portion of the sgRNA (e.g., the about 20 nucleotides within the sgRNA that bind to a target) bind adjacent to a proto spacer adjacent motif (PAM), which can comprise 2-6 nucleotides in the target sequence that is bound by a Cas protein. In certain aspects, the nuclease may be a class 2 CRISPR/Cas endonuclease. In class 2 CRISPR systems, the functions of the effector complex (e.g., the cleavage of target DNA) are carried out by a single endonuclease (e.g., see Zetsche et al, Cell. 2015 Oct. 22; 163(3):759-71; Makarova et al, Nat Rev Microbiol. 2015 November; 13(11):722-36; and Shmakov et al., Mol Cell. 2015 Nov. 5; 60(3):385-97). As such, the term "class 2 CRISPR/Cas protein" is used herein to encompass the endonuclease (the target nucleic acid cleaving protein) from class 2 CRISPR systems. Thus, the term "class 2 CRISPR/Cas endonuclease" as used herein encompasses type II CRISPR/Cas proteins (e.g., Cas9), type V CRISPR/Cas proteins (e.g., Cpf1, C2c1, C2C3), and type VI CRISPR/Cas proteins (e.g., C2c2). To date, class 2 CRISPR/Cas proteins encompass type II, type V, and type VI CRISPR/Cas proteins, but the term is also meant to encompass any class 2 CRISPR/Cas protein suitable for binding to a corresponding guide RNA and forming a ribonucleoprotein (RNP) complex.

In certain aspects, the DBD and the cleavage domain of a nuclease may be present as separate molecules that form a complex, e.g., a single guide RNA and the Cas9 nuclease of a CRISPR-Cas9 system. In other aspects, the DBD and the cleavage domain of a nuclease may be covalently or non-covalently associated. In certain aspects, a nuclease may include a first polypeptide and a second polypeptide that form a complex, e.g., a first polypeptide comprising a first DBD fused to a cleavage half domain and a second polypeptide comprising a second DBD fused to a cleavage half domain may form a dimer that has nuclease activity.

In certain aspects, the DBD and the cleavage domain (or cleavage half domain) of a nuclease may be covalently linked to form a fusion protein. In certain aspects, the DBD and the cleavage domain (or cleavage half domain) may be linked via a linker sequence. A linker can be between about 1 to about 50 amino acid residues in length. A linker can be from about 5 to about 45, from about 5 to about 40, from about 5 to about 35, from about 5 to about 30, from about 5 to about 25, from about 5 to about 20, from about 5 to about 15, from about 10 to about 40, from about 10 to about 35, from about 10 to about 30, from about 10 to about 25, from about 10 to about 20, from about 12 to about 40, from about 12 to about 35, from about 12 to about 30, from about 12 to about 25, from about 12 to about 20, from about 14 to about 40, from about 14 to about 35, from about 14 to about 30, from about 14 to about 25, from about 14 to about 20, from about 14 to about 16, from about 15 to about 40, from about 15 to about 35, from about 15 to about 30, from about 15 to about 25, from about 15 to about 20, from about 15 to about 18, from about 18 to about 40, from about 18 to about 35, from about 18 to about 30, from about 18 to about 25, from about 18 to about 24, from about 20 to about 40, from about 20 to about 35, from about 20 to about 30, or from about 25 to about 30 amino acid residues in length. A linker for linking a DBD to a cleavage domain can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45 or 50 amino acid residues in length.

Cleavage Domains

In certain aspects, the cleavage domain of the nuclease is heterologous to the DBD. Heterologous in the context of a cleavage domain and a DBD as used herein indicates that these domains are derived from different sources and do not exist together in nature.

In some aspects, the cleavage domain of the nuclease comprises a cleavage domain or a half-cleavage domain. In some aspects, the nuclease comprises a first polypeptide that includes a DBD that binds to a first target nucleic acid sequence in the genome of a cell and a half-cleavage domain and a second polypeptide that that includes a DBD that binds to a second target nucleic acid sequence in the genome of the cell and comprises a half-cleavage domain. In some aspects, the first target nucleic acid sequence and the second target sequence are spaced apart in the genome and the two half-cleavage domains mediate a cleavage of a sequence at a location in between the first and second target nucleic acid sequences.

In certain aspects, the DBD provides specificity and targeting of the nuclease to a target sequence in the genome of a cell and the cleavage domain introduces a DSB. In some embodiments, the cleavage domain can be a cleavage half domain, which dimerizes to form an active full domain capable of cleaving DNA. In other embodiments, the cleavage domain is capable of cleaving DNA without needing to dimerize. For example, a cleavage domain comprising a cleavage half domain can be derived from an endonuclease, such as FokI or BfiI. In some embodiments, two cleavage half domains (e.g., FokI or Bfi) can be fused together to form a fully functional single cleavage domain. When half cleavage domains are used as the nuclease, two DBD can be engineered, the first DBD binding to a top strand of a target nucleic acid sequence and comprising a first cleavage half domain and a second DBD binding to a bottom strand of a target nucleic acid sequence and comprising a second half cleavage domain. In some embodiments, the cleavage domain can be derived from a type IIS restriction enzyme, such as FokI or Bfil.

FokI can be a wild-type FokI or can comprise one or more mutations. In some cases, FokI can comprise about 1, 2, 3, 4, 5, 6, 7, 8, 9, 10, or more mutations. A mutation can enhance cleavage efficiency. A mutation can abolish cleavage activity. In some cases, a mutation can enhance homodimerization. For example, FokI can have a mutation at one or more amino acid residue positions to modulate homodimerization. In some instances, a FokI cleavage domain is, for example, as described in Kim et al. "Hybrid restriction enzymes: Zinc finger fusions to Fok I cleavage domain," PNAS 93: 1156-1160 (1996). In other instances, a FokI cleavage domain described herein is a FokI, for example, as described in U.S. Pat. No. 8,586,526, which description is incorporated herein by reference in its entirety. In other instances, a FokI cleavage domain described herein includes the amino acid sequence set forth in NCBI Accession No. ADI71347.1.

In some embodiments, a cleavage domain capable of cleaving DNA without need to dimerize may be derived from a meganuclease. Meganucleases are also referred to as homing endonucleases. In some embodiments, the meganuclease may be I-AniI or I-OnuI.

A cleavage domain fused to a DBD can be an endonuclease or an exonuclease. An endonuclease can include restriction endonucleases and homing endonucleases. An endonuclease can also include S1 Nuclease, mung bean nuclease, pancreatic DNase I, micrococcal nuclease, or yeast HO endonuclease.

Cells

A cell to be contacted with a nuclease can be a eukaryotic cell or a prokaryotic cell. A target cell can be an animal cell or a plant cell. An animal cell can include a cell from a marine invertebrate, fish, insects, amphibian, reptile, or mammal. A mammalian cell can be obtained from a primate, ape, equine, bovine, porcine, canine, feline, or rodent. A mammal can be a primate, ape, dog, cat, rabbit, ferret, or the like. A rodent can be a mouse, rat, hamster, gerbil, hamster, chinchilla, or guinea pig. A bird cell can be from a canary, parakeet or parrots. A reptile cell can be from a turtle, lizard or snake. A fish cell can be from a tropical fish. For example, the fish cell can be from a zebrafish (e.g., *Danio rerio*). A worm cell can be from a nematode (e.g., *C. elegans*). An amphibian cell can be from a frog. An arthropod cell can be from a tarantula or hermit crab.

A mammalian cell can also include cells obtained from a primate (e.g., a human or a non-human primate). A mammalian cell can include an epithelial cell, connective tissue cell, hormone secreting cell, a nerve cell, a skeletal muscle cell, a blood cell, an immune system cell, or a stem cell.

Exemplary mammalian cells can include, but are not limited to, K562, CD34, T cells, CD4+ T cells, CD8+ T cells, 293A cell line, 293FT cell line, 293F cells, 293 H cells, HEK 293 cells, CHO DG44 cells, CHO-S cells, CHO-K1 cells, Expi293F™ cells, Flp-In™ T-REx™ 293 cell line, Flp-In™-293 cell line, Flp-In™-3T3 cell line, Flp-In™-BHK cell line, Flp-In™-CHO cell line, Flp-In™-CV-1 cell line, Flp-In™-Jurkat cell line, FreeStyle™ 293-F cells, FreeStyle™ CHO-S cells, GripTite™ 293 MSR cell line, GS-CHO cell line, HepaRG™ cells, T-REx™ Jurkat cell line, Per.C6 cells, T-REx™-293 cell line, T-REx™-CHO cell line, T-REx™-HeLa cell line, NC-HIMT cell line, PC12 cell line, primary cells (e.g., from a human) including primary T cells, primary hematopoietic stem cells, primary human embryonic stem cells (hESCs), and primary induced pluripotent stem cells (iPSCs).

In some instances, a target cell is a cell comprising one or more single nucleotide polymorphism (SNP). In some instances, a described herein is designed to target and edit a target cell comprising a SNP.

In some cases, a target cell is a cancerous cell. Cancer can be a solid tumor or a hematologic malignancy. The solid tumor can include a sarcoma or a carcinoma. Exemplary sarcoma target cell can include, but are not limited to, cell obtained from alveolar rhabdomyosarcoma, alveolar soft part sarcoma, ameloblastoma, angiosarcoma, chondrosarcoma, chordoma, clear cell sarcoma of soft tissue, dedifferentiated liposarcoma, desmoid, desmoplastic small round cell tumor, embryonal rhabdomyosarcoma, epithelioid fibrosarcoma, epithelioid hemangioendothelioma, epithelioid sarcoma, esthesioneuroblastoma, Ewing sarcoma, extrarenal rhabdoid tumor, extraskeletal myxoid chondrosarcoma, extraskeletal osteosarcoma, fibrosarcoma, giant cell tumor, hemangiopericytoma, infantile fibrosarcoma, inflammatory myofibroblastic tumor, Kaposi sarcoma, leiomyosarcoma of bone, liposarcoma, liposarcoma of bone, malignant fibrous histiocytoma (MFH), malignant fibrous histiocytoma (MFH) of bone, malignant mesenchymoma, malignant peripheral nerve sheath tumor, mesenchymal chondrosarcoma, myxofibrosarcoma, myxoid liposarcoma, myxoinflammatory fibroblastic sarcoma, neoplasms with perivascular epitheioid cell differentiation, osteosarcoma, parosteal osteosarcoma, neoplasm with perivascular epitheioid cell differentiation, periosteal osteosarcoma, pleomorphic liposarcoma, pleomorphic rhabdomyosarcoma, PNET/extraskeletal Ewing tumor, rhabdomyosarcoma, round cell liposarcoma, small cell osteosarcoma, solitary fibrous tumor, synovial sarcoma, or telangiectatic osteosarcoma.

Exemplary carcinoma target cell can include, but are not limited to, cell obtained from anal cancer, appendix cancer, bile duct cancer (i.e., cholangiocarcinoma), bladder cancer, brain tumor, breast cancer, cervical cancer, colon cancer, cancer of Unknown Primary (CUP), esophageal cancer, eye cancer, fallopian tube cancer, gastroenterological cancer, kidney cancer, liver cancer, lung cancer, medulloblastoma, melanoma, oral cancer, ovarian cancer, pancreatic cancer, parathyroid disease, penile cancer, pituitary tumor, prostate cancer, rectal cancer, skin cancer, stomach cancer, testicular cancer, throat cancer, thyroid cancer, uterine cancer, vaginal cancer, or vulvar cancer.

Alternatively, the cancerous cell can comprise cells obtained from a hematologic malignancy. Hematologic malignancy can comprise a leukemia, a lymphoma, a myeloma, a non-Hodgkin's lymphoma, or a Hodgkin's lymphoma. In some cases, the hematologic malignancy can be a T-cell based hematologic malignancy. Other times, the hematologic malignancy can be a B-cell based hematologic malignancy. Exemplary B-cell based hematologic malignancy can include, but are not limited to, chronic lymphocytic leukemia (CLL), small lymphocytic lymphoma (SLL), high-risk CLL, a non-CLL/SLL lymphoma, prolymphocytic leukemia (PLL), follicular lymphoma (FL), diffuse large B-cell lymphoma (DLBCL), mantle cell lymphoma (MCL), Waldenström's macroglobulinemia, multiple myeloma, extranodal marginal zone B cell lymphoma, nodal marginal zone B cell lymphoma, Burkitt's lymphoma, non-Burkitt high grade B cell lymphoma, primary mediastinal B-cell lymphoma (PMBL), immunoblastic large cell lymphoma, precursor B-lymphoblastic lymphoma, B cell prolymphocytic leukemia, lymphoplasmacytic lymphoma, splenic marginal zone lymphoma, plasma cell myeloma, plasmacytoma, mediastinal (thymic) large B cell lymphoma, intravascular large B cell lymphoma, primary effusion lymphoma, or lymphomatoid granulomatosis. Exemplary T-cell based hematologic malignancy can include, but are not limited to, peripheral T-cell lymphoma not otherwise specified (PTCL-NOS), anaplastic large cell lymphoma, angioimmunoblastic lymphoma, cutaneous T-cell lymphoma, adult T-cell leukemia/lymphoma (ATLL), blastic NK-cell lymphoma, enteropathy-type T-cell lymphoma, hematosplenic gamma-delta T-cell lymphoma, lymphoblastic lymphoma, nasal NK/T-cell lymphomas, or treatment-related T-cell lymphomas.

In some cases, a cell can be a tumor cell line. Exemplary tumor cell line can include, but are not limited to, 600MPE, AU565, BT-20, BT-474, BT-483, BT-549, Evsa-T, Hs578T, MCF-7, MDA-MB-231, SkBr3, T-47D, HeLa, DU145, PC3, LNCaP, A549, H1299, NCI-H460, A2780, SKOV-3/Luc, Neuro2a, RKO, RKO-AS45-1, HT-29, SW1417, SW948, DLD-1, SW480, Capan-1, MC/9, B72.3, B25.2, B6.2, B38.1, DMS 153, SU.86.86, SNU-182, SNU-423, SNU-449, SNU-475, SNU-387, Hs 817.T, LMH, LMH/2A, SNU-398, PLHC-1, HepG2/SF, OCI-Ly1, OCI-Ly2, OCI-Ly3, OCI-Ly4, OCI-Ly6, OCI-Ly7, OCI-Ly10, OCI-Ly18, OCI-Ly19, U2932, DB, HBL-1, RIVA, SUDHL2, TMD8, MEC1, MEC2, 8E5, CCRF-CEM, MOLT-3, TALL-104, AML-193, THP-1, BDCM, HL-60, Jurkat, RPMI 8226, MOLT-4, RS4, K-562, KASUMI-1, Daudi, GA-10, Raji, JeKo-1, NK-92, and Mino. In certain aspects, the cell may be a genetically modified cell. Any of the cells disclosed herein may be genetically modified. In certain aspects, the cell may be a cell that expresses or is genetically modified to express proteins involved in homology directed repair (HDR) of DSB in genomic DNA. For example, the cell may express or may be engineered to express one or more of CtIP, BRCA1, or Exo1. In certain aspects, the cell may be engineered to have increased activity of HDR pathway proteins, such as, one or more of CtIP, BRCA1, or Exo1. In certain aspects, the cell may be engineered to have lower activity of NHEJ pathway proteins, such as, 53BP1, as compared to a parental cell from which the engineered cell is derived. In certain aspects, the cell may be a cell that includes NHEJ-promoting modifications, such as expression of proteins involved in NHEJ (e.g., Ku proteins, 53BP1, Rif1), increased activity of NHEJ pathway proteins, and/or lower activity of HDR pathway proteins.

In some embodiments, described herein include methods of modifying a target gene utilizing a nuclease described herein. In some embodiments, genome editing can be performed by nuclease with a DNA binding domain for a particular genomic locus of interest. Genetic modification can involve introducing a functional gene for therapeutic purposes, knocking out a gene for therapeutic gene, or engineering a cell ex vivo (e.g., HSCs or CAR T cells) to be administered back into a subject in need thereof. For example, the nuclease can have a target site within PDCD1, CTLA4, LAG3, TET2, BTLA, HAVCR2, CCR5, CXCR4, TRA, TRB, B2M, albumin, HBB, HBA1, TTR, NR3C1, CD52, erythroid specific enhancer of the BCL11A gene, CBLB, TGFBR1, SERPINA1, HBV genomic DNA in infected cells, CEP290, DMD, CFTR, IL2RG, CS-1, or any combination thereof. In some embodiments, nuclease can cleave double stranded DNA at a target site in order to insert a chimeric antigen receptor (CAR), alpha-L iduronidase (IDUA), iduronate-2-sulfatase (IDS), or Factor 9 (F9). Cells, such as hematopoietic stem cells (HSCs) and T cells, can be engineered ex vivo with the nuclease.

Methods of Production of Nucleases

In certain embodiments, the nuclease is produced using a suitable method including recombinant and non-recombinant methods (e.g., chemical synthesis).

A. Chemical Synthesis

Where a nuclease is chemically synthesized, the synthesis may proceed via liquid-phase or solid-phase. Solid-phase peptide synthesis (SPPS) allows the incorporation of unnatural amino acids and/or peptide/protein backbone modification. Various forms of SPPS, such as Fmoc and Boc, are available for synthesizing nuclease of the present disclosure. Details of the chemical synthesis are known in the art (e.g., Ganesan A. 2006 Mini Rev. Med. Chem. 6:3-10; and Camarero J. A. et al., 2005 Protein Pept Lett. 12:723-8).

B. Recombinant Production

Where a nuclease is produced using recombinant techniques, the nuclease may be produced as an intracellular protein or as a secreted protein, using any suitable construct and any suitable host cell, which can be a prokaryotic or eukaryotic cell, such as a bacterial (e.g., E. coli) or a yeast host cell, respectively. In certain aspects, eukaryotic cells that are used as host cells for production of the nuclease include insect cells, mammalian cells, and/or plant cells. In certain aspects, mammalian host cells are used and may include human cells (e.g., HeLa, 293, H9 and Jurkat cells); mouse cells (e.g., NIH3T3, L cells, and C127 cells); primate cells (e.g., Cos 1, Cos 7 and CV1) and hamster cells (e.g., Chinese hamster ovary (CHO) cells). In specific embodiments, the nucleases disclosed herein are produced in CHO cells.

A variety of host-vector systems suitable for the expression of a nuclease may be employed according to standard procedures known in the art. See, e.g., Sambrook et al., 1989 Current Protocols in Molecular Biology Cold Spring Harbor Press, New York; and Ausubel et al. 1995 Current Protocols in Molecular Biology, Eds. Wiley and Sons. Methods for introduction of genetic material into host cells include, for example, transformation, electroporation, conjugation, calcium phosphate methods and the like. The method for transfer can be selected so as to provide for stable expression of the introduced nuclease-encoding nucleic acid. The nuclease-encoding nucleic acid can be provided as an inheritable episomal element (e.g., a plasmid) or can be genomically integrated. A variety of appropriate vectors for use in production of a nuclease of interest are commercially available.

Vectors can provide for extrachromosomal maintenance in a host cell or can provide for integration into the host cell genome. The expression vector provides transcriptional and translational regulatory sequences and may provide for inducible or constitutive expression where the coding region is operably-linked under the transcriptional control of the transcriptional initiation region, and a transcriptional and translational termination region. In general, the transcriptional and translational regulatory sequences may include, but are not limited to, promoter sequences, ribosomal binding sites, transcriptional start and stop sequences, translational start and stop sequences, and enhancer or activator sequences. Promoters can be either constitutive or inducible, and can be a strong constitutive promoter (e.g., T7).

Also provided herein are nucleic acids encoding the nucleases disclosed herein. In certain aspects, a nucleic acid encoding the nuclease disclosed herein is operably linked to a promoter sequence that confers expression of the nuclease. In certain aspects, the sequence of the nucleic acid is codon optimized for expression of the nuclease in a human cell. In certain aspects, the nucleic acid is a deoxyribonucleic acid (DNA). In certain aspects, the nucleic acid is a ribonucleic acid (RNA). Also provided herein is a vector comprising the nucleic acid encoding the nuclease for binding a target nucleic acid as described herein. In certain aspects, the vector is a viral vector.

Delivery

The nucleases disclosed herein, compositions comprising the disclosed nucleases, and nucleic acids encoding the disclosed nucleases can be delivered into a cell by any suitable means, including, for example, by injection, infection, transfection, and vesicle or liposome mediated delivery.

In certain aspects, a mRNA or a vector encoding the nuclease may be injected, transfected, or introduced via viral infection into a cell, where the cell is ex vivo or in vivo. Any vector systems may be used including, but not limited to, plasmid vectors, retroviral vectors, lentiviral vectors, adenovirus vectors, poxvirus vectors; herpesvirus vectors and adeno-associated virus vectors, etc. Non-viral vector delivery systems include DNA plasmids, naked nucleic acid, and nucleic acid complexed with a delivery vehicle such as a liposome or poloxamer. Viral vector delivery systems include DNA and RNA viruses, which have either episomal or integrated genomes after delivery to the cell. Vectors suitable for introduction of nuclease include described herein include non-integrating lentivirus vectors (IDLV).

Non-viral vector delivery systems include electroporation, lipofection, microinjection, biolistics, virosomes, liposomes, immunoliposomes, polycation or lipid:nucleic acid conjugates, naked DNA, artificial virions, and agent-enhanced uptake of DNA.

In certain aspects, the cells into which a nuclease or a nucleic acid encoding a nuclease is introduced may be an animal cell, e.g., from a human needing treatment or a mammalian cell line. In other aspects, the cell may be a plant cell. DNA constructs may be introduced into (e.g., into the genome of) a desired cell by a variety of conventional techniques. For example, the DNA construct may be introduced directly into the genomic DNA of a plant cell using techniques such as electroporation and microinjection of plant cell protoplasts, or the DNA constructs can be introduced directly to plant tissue using biolistic methods, such as DNA particle bombardment.

In certain aspects, the nuclease is only transiently present in a target cell. For example, the nuclease is expressed from a nucleic acid that expressed the nuclease for a short period of time, e.g., for up to 1 day, 3 days, 1 week, 3 weeks, or 1 month. In applications where transient expression of a nuclease is desired, adenoviral based systems may be used. Adeno-associated virus ("AAV") vectors can also be used to transduce cells with nucleic acids encoding the nuclease, e.g., in the in vitro production of nucleic acids and peptides, and for in vivo and ex vivo gene therapy procedures. In certain aspects, recombinant adeno-associated virus vectors (rAAV) such as replication-deficient recombinant adenoviral vectors may be used for introduction of nucleic acids encoding the nuclease.

In certain aspects, nucleic acids encoding a nuclease can be delivered using a gene therapy vector with a high degree of specificity to a particular tissue type or cell type. A viral vector is typically modified to have specificity for a given cell type by including a sequence encoding a ligand expressed as a fusion protein with a viral coat protein on the viruses' outer surface. The ligand is chosen to have affinity for a receptor known to be present on the cell type of interest.

In certain aspects, the nucleic acid encoding a nuclease may be codon optimized to enhance expression of the nuclease in the target cell. For example, the sequence of the nucleic acid can be varied to provide codons that are known to be highly used in animal cells, such as, human cells to enhance production of the nuclease in a human cell. For example, silent mutations may be made in the nucleotide sequence encoding a nuclease for codon optimization in mammalian cells. Similar codon optimization can be used for optimal expression in other host cell systems (e.g. plant, fungal, etc.).

Compositions and Kits

Also disclosed herein are compositions comprising the plurality of labeled oligonucleotides complementary to a single stranded (ss) 3'-overhang created at the cleavage site for the nuclease. In certain aspects, the kit may include the plurality of labeled oligonucleotides complementary to a single stranded (ss) 3'-overhang created at the cleavage site for the nuclease and the nuclease or a nucleic acid encoding the nuclease for detecting induction of cleavage at a cleavage site for the nuclease in genomic DNA in a cell.

The kit may also include a first population and a second population of oligonucleotides.

The recombinant nuclease may be a DNA-binding domain (DBD) comprising a guide RNA, a Zinc-finger protein, a plurality of repeats units derived from a TALE protein, and/or any of the nucleases disclosed herein.

In certain aspects, the oligonucleotides may hybridize across a 1 kb-30 kb long stretch of the ss 3'-overhang. In certain aspects, the kit may be used for detecting an on-target cleavage site or an off-target cleavage site simultaneously in a cell. The kit may include a first population of oligonucleotides complementary to the ss 3'-overhang created at the on-target cleavage site and a second population of oligonucleotides complementary to the ss 3'-overhang created at the off-target cleavage site, wherein the first and second populations of oligonucleotides are differentially labeled.

In certain aspects, the nuclease and the nucleic acids, such as, the oligonucleotides, described herein may be present in a pharmaceutical composition comprising a pharmaceutically acceptable excipient. In certain aspects, the polypeptides and the nucleic acids are present in a therapeutically effective amount in the pharmaceutical composition. A therapeutically effective amount can be determined based on an observed effectiveness of the composition. A therapeutically effective amount can be determined using assays that measure the desired effect in a cell, e.g., in a reporter cell line in which expression of a reporter is modulated in response to the polypeptides of the present disclosure. The pharmaceutical compositions can be administered ex vivo or in vivo to a subject in order to practice the therapeutic and prophylactic methods and uses described herein.

The pharmaceutical compositions of the present disclosure can be formulated to be compatible with the intended method or route of administration; exemplary routes of administration are set forth herein. Suitable pharmaceutically acceptable or physiologically acceptable diluents, carriers or excipients include, but are not limited to, nuclease inhibitors, protease inhibitors, a suitable vehicle such as physiological saline solution or citrate buffered saline.

The methods, compositions, and kits of the present disclosure find use in development of genome editing tools and related treatment methods. For example, the methods, compositions, and kits of the present disclosure may be used to assess specificity of a nuclease and/or optimize concentration of the nuclease to decrease off-target cleavage.

EXAMPLES

These examples are provided for illustrative purposes only and not to limit the scope of the claims provided herein.

Example 1

Detection of Ss 3'-Overhang Created a Nuclease Cleavage Site

The following materials and methods may be utilized for detection of ss 3'-overhang created a nuclease cleavage site.
Plate Coating with Poly L-Lysine (PLL)
  Use 24-well glass-bottom plates (#1.5H), Cellvis, cat.no. P24-1.5H-N
  add 0.5 mL/well poly-L-lysine solution (0.1%, SigmaAldrich, cat.no. P8920)
  incubate 1-2 hrs @RT
  aspirate PLL with pipette, keep for future use (can reuse for several plates, store @4 C)
  rinse the plate with 0.5 mL/well ddH2O—3 times
  remove water from wells, let dry overnight @RT
  Alternatively, use P24-1.5H-N-PLL-1/5 pre-coated plates, BioMedTech Laboratories, Inc.
Cell Preparation
  Seed cells onto poly-1-lysine coated glass-bottom 24-well plate
    pre-wash cells with PBS
    resuspend to ~2,000,000 cells/mL in PBS
    spot 20-50 uL cells onto the center of each well
    let settle for 10-15 min @RT
  Fix cells in 0.5 mL/well of fresh 4% PFA in 1×PBS
    carefully add 500 uL onto the wall of each well
    gently shake plate to dislodge poorly attached cells
    incubate for 10 min @RT
  Wash cells with 0.5 mL/well 1×PBS—twice, 5 min each wash
  Optional: if needed, cells can be held for 24-48 hours at 4° C.
  Permeabilize cells with 0.5 mL/well 0.5% Triton X-100 in 1×PBS for 15 min @RT Wash cells with 0.5 mL/well 1×PBS—twice, 5 min each wash
Incubate cells in 0.3 mL/well 2×SSC+25 ug/mL RNase A for 30 minutes at 37° C.
Wash cells with 0.5 mL/well 2×SSC–2×5 min
Pre-equilibrate cells with 0.5 mL/well 50% Formamide, 2×SSC [pH 7] for at least 30 minutes @RT prior to denaturation Hybridization
Prepare Hyb solution with oligo probes:
need 250 uL/well
hyb buffer: 50% formamide, 10% dextran sulfate, 0.05% Tween-20, 2×SSC
mix 2×hyb stock+100% formamide 1:1, then add Tween-20 (1:200 from 10% stock)
2×hyb stock: 20% dextran sulfate, 4×SSC—stored @4 C
pre-warm hyb stock to RT, mix well by vortexing
dilute 10 uM probes in Hyb buffer 1:40 (250 nM final concentration)
mix well by vortexing and/or inverting (on rotator)
Add probes to wells:
up to 4 wells at a time, avoid drying
remove equilibration buffer and add 250 uL Hyb solution
gently rock the plate to spread hyb solution on well surface
cover the well-plate with Parafilm and seal each well
transfer the well-plate into a dark chamber and incubate overnight at 37° C. (use TC incubator or Hybridization oven)

NOTE: sample should be protected from light during all subsequent steps.

Washes
Remove hyb solution with pipette, add 200 uL/well 2×SSC, gently rock the plate to mix remaining hyb solution with SSC
Aspirate SSC and wash cells with 0.5 mL/well 2×SSC—3×10 min @RT
Wash with 0.2×SSC, 0.2% Tween-20—2 times:
add 0.5 mL/well wash buffer (room temperature)
place the well-plate onto a digital hot plate set to 56° C. incubate for 7 minutes
Wash cells with 0.5 mL/well 4×SSC, 0.2% Tween-20—5 min @RT
Optional: transfer to IF protocol
Incubate cells in 0.3 mL/well of 2×SSC+100 ng/mL DAPI—10 min @RT
Wash cells with 2×SSC—2×5 min Mounting
Use pre-washed 12 mm round glass coverslips (#2)
Place a 10 uL drop of Prolong Gold onto a coverslip (up to 4 coverslips at a time)
Aspirate SSC from the well
Using tweezers, invert a coverslip with Prolong Gold and gently place onto cells in a well. Avoid bubbles, do not squeeze cells
Let Prolong Gold cure for 24 hrs @RT While preferred embodiments of the present invention have been shown and described herein, it will be apparent to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

For reasons of completeness, certain aspects of the polypeptides, composition, and methods of the present disclosure are set out in the following numbered clauses:

1. A method for detecting induction of cleavage in genomic DNA by a nuclease, the method comprising: contacting a live cell comprising genomic DNA comprising a cleavage site for the nuclease with the nuclease under conditions sufficient for induction of cleavage at the cleavage site; fixing the cell and contacting the fixed cell with a plurality of oligonucleotides complementary to a single stranded (ss) 3'-overhang created at the cleavage site, wherein the genomic DNA is not denatured; and detecting hybridization of the plurality of oligonucleotides to the ss 3'-overhang, wherein hybridization of the oligonucleotides indicates induction of the cleavage by the nuclease.

2. The method of clause 1, wherein the nuclease comprises Zinc-finger protein nuclease (ZFPN), a transcription activator-like effector nuclease (TALEN), a megaTAL, a meganuclease, or a CAS nuclease.

3. The method of clause 1 or 2, wherein the ss 3'-overhang is 1 kilobase (kb)-30 kb in length.

4. The method of clause 1 or 2, wherein the ss 3'-overhang is 1 kb in length.

5. The method of any one of clauses 1-4, wherein the plurality of oligonucleotides comprises 10-200 oligonucleotides.

6. The method of any one of clauses 1-4, wherein the plurality of oligonucleotides comprises 10-100 oligonucleotides.

7. The method of any one of clauses 1-4, wherein the plurality of oligonucleotides comprises 10-50 oligonucleotides.

8. The method of any one of clauses 1-4, wherein the plurality of oligonucleotides comprises 10-30 oligonucleotides.

9. The method of any one of clauses 1-8, wherein the oligonucleotides have different sequences.

10. The method of any one of clauses 1-8, wherein the oligonucleotides have the same sequence.

11. The method of any one of clauses 1-10, wherein the oligonucleotides are 10-200 nucleotides long.

12. The method of any one of clauses 1-10, wherein the oligonucleotides are 10-100 nucleotides long.

13. The method of any one of clauses 1-10, wherein the oligonucleotides are 10-70 nucleotides long.

14. The method of any one of clauses 1-13, wherein the oligonucleotides comprise a detectable moiety.

15. The method of clause 14, wherein the detectable moiety comprises a fluorescent molecule.

16. The method of clause 14, wherein the detectable moiety comprises a first member of a specific binding pair and wherein the detectable moiety is detected by binding a labeled second member of the specific binding pair to the first member.

17. The method of clause 16, the specific binding pair comprises biotin/streptavidin or antigen/antibody.

18. The method of clause 14, wherein the detectable moiety comprises a probe complementary to at least one of the oligonucleotides and wherein the detectable moiety is detected by hybridizing the probe to the oligonucleotide.

19. The method of any one of clauses 1-18, wherein the step of fixing the cell is conducted within 24 hrs of the step of contacting the cell with the nuclease.

20. The method of any one of clauses 1-18, wherein the step of fixing the cell is conducted within 12 hrs-24 hrs of the step of contacting the cell with the nuclease.

21. The method of any one of clauses 1-18, wherein the step of fixing the cell is conducted within 6 hrs-24 hrs of the step of contacting the cell with the nuclease.

22. The method of any one of clauses 1-21, wherein the step of contacting the cell with the plurality of oligonucleotides is performed at a temperature ranging 18° C.-50° C.

23. The method of any one of clauses 1-21, wherein the step of contacting the cell with the plurality of oligonucleotides is performed at room temperature.

24. The method of any one of clauses 1-21, wherein the step of contacting the cell with the plurality of oligonucleotides is performed at 37° C.

25. The method of any one of clauses 1-24, wherein the step of contacting the cell with the nuclease comprises introducing the nuclease into the cell.

26. The method of any one of clauses 1-24, wherein the step of contacting the cell with the nuclease comprises introducing a nucleic acid encoding the nuclease into the cell.

27. The method of any one of clauses 1-26, wherein the step of detecting hybridization comprises imaging the cell.

28. The method of clause 27, wherein imaging the cell comprises acquiring images of the cell by a microscopy mode selected from the group consisting of: epifluorescence, widefield, confocal, selective plane illumination, tomography, holography, super-resolution, and synthetic aperture optics (SAO).

29. The method of any one of clauses 1-28, wherein the ss 3'-overhang is present in the top strand of the genomic DNA and wherein a second ss 3'-overhang is present in the bottom strand at the cleavage site and wherein the method comprises contacting the cell with a second plurality of oligonucleotides complementary to the second ss 3'-overhang.

30. The method of clause 29, wherein the first and second plurality of oligonucleotides are differentially labeled.

31. The method of clause 29, wherein the first and second plurality of oligonucleotides comprise the same detectable moiety.

32. The method of any one of clauses 1-31, wherein the cleavage site is an on-target cleavage site.

33. The method of any one of clauses 1-31, wherein the cleavage site is an off-target cleavage site.

34. The method of clause 33, wherein the off-target cleavage site is a site known to be cleaved by the nuclease.

35. The method of clause 33, wherein off-target cleavage site is a site predicted to be cleaved by the nuclease.

36. The method of any one of clauses 1-31, wherein the cell comprises at least one on-target cleavage site and at least one off-target cleavage site and the method comprises detecting on-target and off-target cleavage induced by the nuclease, the method comprising contacting the fixed cells with a first plurality of oligonucleotides complementary to a single stranded (ss) 3'-overhang created at the on-target cleavage site and a second plurality of oligonucleotides complementary to a single stranded (ss) 3'-overhang created at the off-target cleavage site, wherein the first and second plurality of oligonucleotides are differentially labeled, and detecting hybridization of the first and the second plurality of oligonucleotides to the respective ss 3'-overhangs, wherein hybridization of the first plurality of oligonucleotides indicates induction of the on-target cleavage by the nuclease, and wherein hybridization of the second plurality of oligonucleotides indicates induction of the off-target cleavage by the nuclease.

37. The method of any one of clauses 1-36, wherein the method further comprises, decreasing the concentration of the nuclease in the live cell when an off-target cleavage is detected.

38. The method of any one of clauses 1-31, wherein the step of contacting the live cell comprises contacting the live cell with a first and a second nuclease, wherein the live cell comprises a first cleavage site for the first nuclease and a second cleavage site for the second nuclease, and wherein contacting the fixed cell with a plurality of oligonucleotides comprises contacting the fixed cell with a first population of oligonucleotides complementary to a first single stranded (ss) 3'-overhang created at the first cleavage site and with a second population of oligonucleotides complementary to a second single stranded (ss) 3'-overhang created at the second cleavage site, wherein the first and second populations of oligonucleotides are differentially labeled.

39. The method of clause 38, wherein the first and second cleavage sites are on-target cleavage sites.

40. The method of clause 38, wherein the first and second cleavage sites are off-target cleavage sites.

41. The method of clause 40 wherein the method comprises detecting an off-target cleavage induced by the first and/or the second nuclease, wherein the live cell comprises an off-target cleavage site for the first nuclease and/or the second nuclease, the method comprising contacting the fixed cells with a third population of oligonucleotides complementary to a single stranded (ss) 3'-overhang created at the off-target cleavage site for the first nuclease and/or with a fourth population of oligonucleotides complementary to a single stranded (ss) 3'-overhang created at the off-target cleavage site for the second nuclease, and detecting hybridization of the third and/or fourth plurality of oligonucleotides to the respective ss 3'-overhang(s), wherein hybridization of the third population of oligonucleotides indicates induction of the off-target cleavage by the first nuclease, wherein hybridization of the fourth population of oligonucleotides indicates induction of the off-target cleavage by the second nuclease, wherein the first, second, third, and fourth populations of oligonucleotides are differentially labeled.

42. The method of any one of clauses 1-41, wherein the step of contacting the live cell comprises contacting the live cell with a first, a second, and a third nuclease, wherein the live cell comprises a first cleavage site for the first nuclease, a second cleavage site for the second nuclease, and a third cleavage site for the third nuclease and wherein contacting the fixed cell with a plurality of oligonucleotides comprises contacting the fixed cell with a first population of oligonucleotides complementary to a first single stranded (ss) 3'-overhang created at the first cleavage site, with a second population of oligonucleotides complementary to a second single stranded (ss) 3'-overhang created at the second cleavage site, and a third population of oligonucleotides complementary to a third single stranded (ss) 3'-overhang created at the third cleavage site, wherein the first, second, and third populations of oligonucleotides are differentially labeled.

43. The method of clause 42 wherein the first, second, and/or third cleavage sites are on-target cleavage sites.

44. The method of clause 42, wherein the first, second, and/or third cleavage sites are off-target cleavage sites.

45. A kit for detecting induction of cleavage at a cleavage site for a recombinant nuclease in genomic DNA in a cell, comprising:

a plurality of labeled oligonucleotides complementary to a single stranded (ss) 3'-overhang created at the cleavage site for the recombinant nuclease; and the recombinant nuclease.

46. The kit of clause 45, wherein the recombinant nuclease comprises a DNA-binding domain (DBD) comprising a guide RNA.

47. The kit of clause 45, wherein the recombinant nuclease comprises a DBD comprising a Zinc-finger protein.

48. The kit of clause 45, wherein the recombinant nuclease comprises a DBD comprising a plurality of repeats units derived from a TALE protein.

49. The kit of any one of clauses 45-48, wherein the ss 3'-overhang is 1 kilobase (kb)-30 kb in length and the plurality of labeled oligonucleotides hybridize across the length of the ss 3'-overhang.

50. The kit of any one of clauses 45-48, wherein the ss 3'-overhang is 1 kb in length and the plurality of labeled oligonucleotides hybridize across the length of the ss 3'-overhang.

51. The kit of any one of clauses 45-48, wherein the cleavage site is an on-target cleavage site.

52. The kit of any one of clauses 45-48, wherein the cleavage site is an off-target cleavage site.

53. The kit of any one of clauses 45-50, for detection of on-target and off-target cleavage by the nuclease, comprising a first population of oligonucleotides complementary to the ss 3'-overhang created at the on-target cleavage site and a second population of oligonucleotides complementary to the ss 3'-overhang created at the off-target cleavage site, wherein the first and second populations of oligonucleotides are differentially labeled.

What is claimed is:

1. A method for detecting induction of cleavage in genomic DNA by a nuclease, the method comprising:
   contacting a live cell comprising genomic DNA comprising a cleavage site for the nuclease with the nuclease under conditions sufficient for induction of cleavage at the cleavage site;
   fixing the cell and contacting the fixed cell with a plurality of oligonucleotides complementary to a single stranded (ss) 3'-overhang created at the cleavage site, wherein the ss 3'-overhang is at least 1 kb in length, wherein the genomic DNA is not denatured; and
   detecting hybridization of the plurality of oligonucleotides to the ss 3'-overhang,
   wherein hybridization of the oligonucleotides indicates induction of the cleavage by the nuclease.

2. The method of claim 1, wherein the nuclease comprises Zinc-finger protein nuclease (ZFPN), a transcription activator-like effector nuclease (TALEN), a megaTAL, a meganuclease, or a CAS nuclease.

3. The method of claim 1, wherein the ss 3'-overhang is 1 kilobase (kb)-30 kb in length.

4. The method of claim 1, wherein the plurality of oligonucleotides comprises 10-200 oligonucleotides.

5. The method of claim 1, wherein the oligonucleotides are 10-200 nucleotides long.

6. The method of claim 1, wherein the oligonucleotides comprise a detectable moiety.

7. The method of claim 6, wherein the detectable moiety comprises a fluorescent molecule.

8. The method of claim 1, wherein the step of fixing the cell is conducted within 24 hrs of the step of contacting the cell with the nuclease.

9. The method of claim 1, wherein the step of contacting the cell with the plurality of oligonucleotides is performed at a temperature ranging 18° C.-50° C.

10. The method of claim 1, wherein detecting hybridization comprises imaging the cell, wherein imaging the cell comprises acquiring images of the cell by a microscopy mode selected from the group consisting of: epifluorescence, widefield, confocal, selective plane illumination, tomography, holography, super-resolution, and synthetic aperture optics (SAO).

11. The method of claim 1, wherein the ss 3'-overhang is present in the top strand of the genomic DNA and wherein a second ss 3'-overhang is present in the bottom strand at the cleavage site and wherein the method comprises contacting the cell with a second plurality of oligonucleotides complementary to the second ss 3'-overhang.

12. The method of claim 11, wherein the first and second plurality of oligonucleotides are differentially labeled.

13. The method of claim 1, wherein the cleavage site is an on-target cleavage site.

14. The method of claim 1, wherein the cleavage site is an off-target cleavage site.

15. The method of claim 1, wherein the cell comprises at least one on-target cleavage site and at least one off-target cleavage site and the method comprises detecting on-target and off-target cleavage induced by the nuclease, the method comprising contacting the fixed cells with a first plurality of oligonucleotides complementary to a single stranded (ss) 3'-overhang created at the on-target cleavage site and a second plurality of oligonucleotides complementary to a single stranded (ss) 3'-overhang created at the off-target cleavage site, wherein the first and second plurality of oligonucleotides are differentially labeled, and detecting hybridization of the first and the second plurality of oligonucleotides to the respective ss 3'-overhangs, wherein hybridization of the first plurality of oligonucleotides indicates induction of the on-target cleavage by the nuclease, and wherein hybridization of the second plurality of oligonucleotides indicates induction of the off-target cleavage by the nuclease.

16. The method of claim 1, wherein the method further comprises, decreasing the concentration of the nuclease in the live cell when an off-target cleavage is detected.

17. The method of claim 1, wherein the step of contacting the live cell comprises contacting the live cell with a first and a second nuclease, wherein the live cell comprises a first cleavage site for the first nuclease and a second cleavage site for the second nuclease, and wherein contacting the fixed cell with a plurality of oligonucleotides comprises contacting the fixed cell with a first population of oligonucleotides complementary to a first single stranded (ss) 3'-overhang created at the first cleavage site and with a second population of oligonucleotides complementary to a second single stranded (ss) 3'-overhang created at the second cleavage site, wherein the first and second populations of oligonucleotides are differentially labeled.

18. The method of claim 17, wherein the first and second cleavage sites are on-target cleavage sites.

19. The method of claim 17, wherein the first and second cleavage sites are off-target cleavage sites.

20. The method of claim 1, wherein the ss 3'-overhang is about 5 kb in length.

21. The method of claim 1, wherein the plurality of oligonucleotides comprises 10-50 oligonucleotides.

22. The method of claim 1, wherein the oligonucleotides are 30-50 nucleotides long.

23. The method of claim 1, wherein the step of fixing the cell is conducted within 6hrs-24 hrs of the step of contacting the cell with the nuclease.

\* \* \* \* \*